US007120455B1

(12) United States Patent
Chen et al.

(10) Patent No.: US 7,120,455 B1
(45) Date of Patent: Oct. 10, 2006

(54) METHOD AND SYSTEM FOR MOBILE INSTANT MESSAGING USING MULTIPLE INTERFACES

(75) Inventors: Xuming Chen, San Ramon, CA (US); Syed Haider, Walnut Creek, CA (US); Jerry Kupsh, Concord, CA (US); Biren Patel, Fremont, CA (US); Adrian Velthuis, Crownsville, MD (US)

(73) Assignee: Cellco Partnership, Bedminster, NJ (US)

( * ) Notice: Subject to any disclaimer, the term of this patent is extended or adjusted under 35 U.S.C. 154(b) by 145 days.

(21) Appl. No.: 10/851,778

(22) Filed: May 20, 2004

(51) Int. Cl.
*H04Q 7/20* (2006.01)
(52) U.S. Cl. .................... 455/466; 455/419; 455/414.1
(58) Field of Classification Search ................ 455/466, 455/403, 413, 414.1, 418, 419, 420, 428; 709/204, 206; 379/88.22, 88.06
See application file for complete search history.

(56) References Cited

U.S. PATENT DOCUMENTS

| 6,757,365 | B1* | 6/2004 | Bogard | 379/88.17 |
| 6,941,149 | B1* | 9/2005 | Smith et al. | 455/466 |
| 6,976,092 | B1* | 12/2005 | Daniell et al. | 709/246 |
| 2003/0177184 | A1* | 9/2003 | Dickerman et al. | 709/204 |
| 2004/0003046 | A1* | 1/2004 | Grabelsky et al. | 709/206 |
| 2004/0142709 | A1* | 7/2004 | Coskun et al. | 455/466 |
| 2005/0086309 | A1* | 4/2005 | Galli et al. | 709/206 |

OTHER PUBLICATIONS

"The Wireless Village Initiative: Command Line Protocol Version 1.1 [WV-031]", Wireless Village Version 1.1 Specifications, Jul. 31, 2002.

* cited by examiner

*Primary Examiner*—Cong Van Tran
(74) *Attorney, Agent, or Firm*—Darby & Darby

(57) ABSTRACT

A system and method for exchanging messages between a mobile device and a plurality of IM services. The system includes an SMS-based MIM client that runs on a mobile device and provides a plurality of user interfaces for a plurality of respective IM services. A user of the mobile device can log in to at least one of the IM services using the MIM client, and the mobile phone user can use the MIM client to exchange text messages with users logged into the at least one chosen IM service.

25 Claims, 17 Drawing Sheets

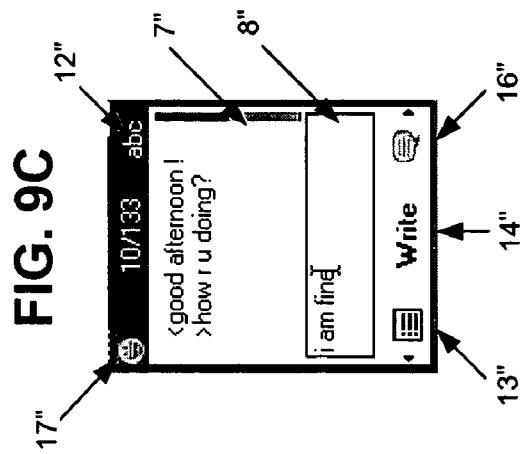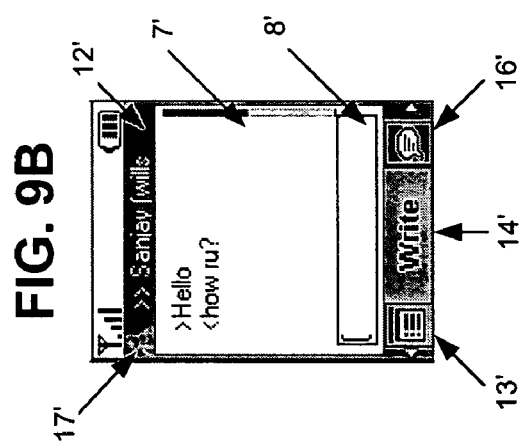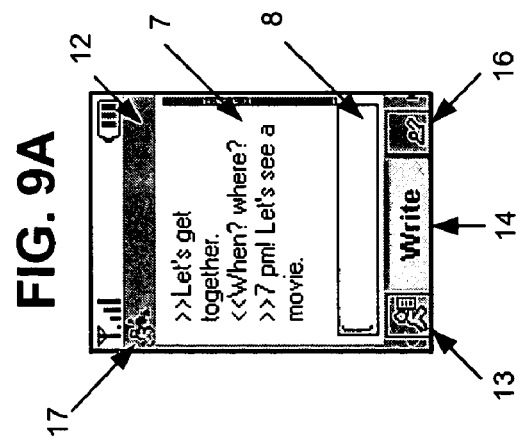

FIG. 10

| Acronym | Action | AOL | MSN | Yahoo |
|---|---|---|---|---|
| LI | Login | 118012245001 | 118012246001 | 118012243001 |
| LO | Logout | 118012245002 | 118012246002 | 118012243002 |
| M | Message Sent | 118012245003 | 118012246003 | 118012243003 |
| P | Presence Update | 118012245004 | 118012246004 | 118012243004 |
| L | Refresh List | 118012245005 | 118012246005 | 118012243005 |
| A | Add Friend | 118012245006 | 118012246006 | 118012243006 |
| R | Remove Friend | 118012245007 | 118012246007 | 118012243007 |
| AC | Accept Friend | 118012245008 | 118012246008 | 118012243008 |
| DN | Deny Friend | 118012245009 | 118012246009 | 118012243009 |
| AB | Add Block | 118012245010 | 118012246010 | 118012243010 |
| SL | Subscribe List | 118012245011 | 118012246011 | 118012243011 |
| RB | Remove Block | 118012245012 | 118012246012 | 118012243012 |
| LB | Get Block List |  | 118012246013 | 118012243013 |
| AD | Accept & Add |  | 118012246014 | 118012243014 |

FIG. 11

Login Request:

Syntax:
LI <version> <s-id> <uid> <pwd> <sub_notf> where,
    <version>    : version of the client
    <s-id>    : session ID
    <uid>    : user ID
    <pwd>    : user password
    <sub_notf>    : subscribe to notifications; 0 = disabled, 1 = enabled Example:
    AOL Login Request: LI 1.1.2.13a 9 vzwuser secret 0
    MSN Login Request: LI 1.1.2.13a 1 vzwuser@3 secret 0

FIG. 12

Login Response:

Syntax:

<header><p><t><n><m><s><cc> <s-code> <id1> <p-code> <size><f-name>, <id2> <p-code> <size><f-name>...

where,

| | |
|---|---|
| <header> | : an OEM specified header used for routing this message to the MIM client |
| <p> | : provider ID; AOL=1, Yahoo = 2, MSN=3 |
| <t> | : transaction ID |
| <n> | : message number |
| <m> | : total number of messages in the transaction |
| <s> | : session ID |
| <cc> | : command ID; Login = LI |
| <s-code> | : status code; Success=0, Domain name not supported=8, User ID unknown=9, Service unavailable. Please try again later=54, Success, more contacts available=70, Cannot login, client must be upgraded=71 |
| <id> | : user ID |
| <p-code> | : presence code; Online=1, Offline=2, Be right back=3, Away=4, Do not disturb=5, In a meeting=6 |
| <size> | : length of friendly name in bytes, size field is 2 bytes wide |
| <f-name> | : friendly name |

Example:

//BREW:xxx:31115LI 0 combp@2 1 10BirenPhone,shaider2000@2 1 14Haider, Syed M,pwcheung00@2 1 15Skin Egg \(o)/

PREFIX: <HEADER><P><T><N><M><S><CC> <S-CODE>

FIRST CONTACT: <ID1> <P-CODE> <SIZE><F-NAME>

SECOND CONTACT: <ID2> <P-CODE> <SIZE><F-NAME>

THIRD CONTACT: <ID3> <P-CODE> <SIZE><F-NAME>

FIG. 15

IM with Presence Updates:

Syntax:
<header><p><t><n><m><s>M<byteoffset> <s-code> <optsid> <msg><$PU_1$>,...<$PU_n$> or <header><p><t><n><m><s>M<byteoffset> <s-code> <sid> <p-code> <msg><$PU_1$>,...<$PU_n$> where,
- <header> : an OEM specified header used for routing this message to the MIM client
- <p> : provider ID; AOL=1, Yahoo = 2, MSN=3
- <t> : transaction ID
- <n> : message number
- <m> : total number of messages in the transaction
- <s> : session ID
- <M> : instant message primitive identifier
- <byteoffset> : location in bytes for presence update data
- <s-code> : status code; this will be set to 0=Instant Message resulting from IM primitive
- <optsid> : optimized sender ID; AOL=1, Yahoo = 2, MSN=3
- <sid> : sender ID
- <p-code> : presence code; Online=1, Offline=2, Be right back=3, Away=4, Do not disturb=5, In a meeting=6
- <msg> : message body
- <$PU_1$>...<$PU_n$> : presence updates, including the contact's address and presence code Example A:
//MIM:xxx:31111M41 0 john@3 Hello Brandiekevin@1 1,jerry@2 1

- PREFIX <HEADER><P><T><N><M><S> — 15 CHARACTERS
- MESSAGE M<BYTEOFFSET> <S-CODE> <OPTSID> <MSG> — 26 CHARACTERS
- PREFIX & MESSAGE = BYTE OFSET 41 CHARACTERS
- FIRST PRESENCE UPDATE — 9 CHARACTERS
- SECOND PRESENCE UPDATE — 10 CHARACTERS
- PRESENCE UPDATES 19 CHARACTERS

Example B:
//BREW:xxx:22118M38 0 combptest 0 Testvijay_r_aggarwal 2,npate 2

- PREFIX <HEADER><P><T><N><M><S> — 16 CHARACTERS
- MESSAGE M<BYTEOFFSET> <S-CODE> <SID> <P-CODE> <MSG> — 22 CHARACTERS
- PREFIX & MESSAGE = BYTE OFFSET 38 CHARACTERS
- FIRST PRESENCE UPDATE — 18 CHARACTERS
- SECOND PRESENCE UPDATE — 8 CHARACTERS
- PRESENCE UPDATES 26 CHARACTERS

METHOD AND SYSTEM FOR MOBILE INSTANT MESSAGING USING MULTIPLE INTERFACES

FIELD OF THE INVENTION

The present invention relates to wireless communications networks, and more particularly, relates to wireless communications networks that allow users to engage in text messaging and instant messaging.

BACKGROUND OF THE INVENTION

Mobile devices, such as mobile phones and other hand-held devices, are typically available with various applications and functions. For example, conventional mobile devices, such as mobile phones and other hand-held devices, are capable of receiving and/or sending text messages. The ability to send and receive text messages provides mobile phone users with the ability to exchange short messages without having to establish a voice call.

Short Message Service (SMS)

Short Message Service (SMS) is a service that enables users to exchange short text messages (SMS messages) of up to 256 bytes over a communications network. SMS is characterized by out-of-band packet delivery and low-bandwidth message transfer, which results in a highly efficient means for transmitting short bursts of data. SMS messages can originate from various sources, in various ways, such as by using a user terminal such as a mobile phone or other hand-held device that is configured to exchange SMS messages. Final destinations for SMS messages are also not limited to hand-held devices and could include e-mail addresses and fax machines.

SMS is a store and forward service, i.e., SMS messages are not sent directly from sender to recipient, but always via a Short Message Service Center (SMSC) described below. The SMSC handles and manages the SMS messages.

SMS enables an active mobile phone to receive or submit a short message at any time, independent of whether a voice or data call is in progress. SMS messages are exchanged independently of each other, and as such, SMS communication does not require the establishment of a simultaneous and contiguous end-to-end traffic path.

SMS also guarantees delivery of the SMS message by the network. Temporary failures due to an unavailable receiving (destination) device can be identified, and the SMS message can be stored in the SMSC until the destination device becomes available.

SMS also enables receipt notification of SMS messages. After the destination device has received the SMS message, an acknowledgement indicating the SMS message has been delivered is returned to the sender.

A terminal configured for SMS provides the user with methods to compose, edit, send, receive, read, and delete messages. Whenever an SMS capable terminal is registered to a network, it is capable of exchanging SMS messages, even when the terminal is engaged in a voice or data call. If the intended destination is not available or does not acknowledge delivery, any number of message handling routines may be initiated, including re-transmitting the message at periodic intervals or discarding the message.

Base Station (BS)

The basic network architecture of a conventional communications network utilizing SMS is shown in FIG. 1. The network serves as the communications medium for the messages and provides a system for exchanging SMS messages. Various types of data, such as SMS messages, voice calls, photos, and other multimedia files, can be exchanged between a mobile phone or other communication device and a base station (BS). The base station controls the radio signals of one or more communication devices within a given range surrounding the base station.

Mobile Switching Center (MSC)

A Mobile Switching Center (MSC) performs the switching functions of the network and controls calls to and from various telephone and data systems. The MSC delivers and receives the SMS messages to and from mobile device users through the proper base stations.

Home Location Register (HLR) and Visiting Location Register (VLR)

Location registers supplement MSCs with information about the users. The MSC interacts with a Home Location Register (HLR), which is a database used for permanent storage and management of subscriptions and service profiles. Each user is associated with a single HLR, which retains the user's record. The HLR is maintained by the cellular service provider associated with the particular MSC. The HLR provides routing information, e.g., user information, including address, account status, and preferences, for an indicated user.

The MSC also interacts with a Visiting Location Register (VLR), which maintains temporary user information (such as current location) to manage requests from users (roamers) who are out of the area covered by their home system. Information on roamers is obtained from each roamer's home HLR.

When a MSC detects a mobile user's presence in the area covered by the particular MSC, the MSC first determines if the user is in their home area or is roaming, i.e., the user is a visitor. When the user is in their home area, the HLR associated with the MSC has the necessary information for initiating, terminating, or receiving a call. When the user is roaming, the VLR contacts the user's HLR to get the necessary information to set up a temporary user profile.

The user's location is recorded in the HLR, and if the user is roaming, the user's location is also recorded in the VLR.

If the user is in their home area and wants to initiate a call or send a message, the MSC contacts the HLR prior to setting up the call. If the user is roaming and wants to initiate a call or send a message, the MSC contacts the VLR prior to setting up the call.

If the user is in their home area and there is a call or message for the user, then the call or the message goes to the home MSC and the home MSC delivers the call immediately. If the user is roaming and there is a call or message for the user, the home MSC contacts the VLR to determine the appropriate route to deliver the arriving call and then transfers the call to the roaming area MSC. Also, if the destination device is not available when message delivery is attempted, the HLR for the destination device informs the MSC when the destination device is recognized as accessible by the mobile network, and thus the message can be delivered.

Short Message Service Center (SMSC)

A Short Message Service Center (SMSC) is a message center (MC) that relays SMS messages through the network. The SMS message is sent through the communications network via the MSCs and is received and stored by the desired SMSC. After being relayed to a desired SMSC, the SMSC stores and forwards the SMS messages. The SMSC determines if the intended destination device of the message is available to the network, and if so, the message is then sent to that destination device. Whenever an SMS-capable terminal is registered to a network, it is capable of exchanging SMS messages, even when the terminal is engaged in a voice or data call. If the intended destination is not available or does not acknowledge delivery, the SMSC may then initiate any number of message handling routines including re-transmitting the message at periodic intervals or discarding the message.

SMS messages include several elements in addition to the text of the message. An SMS message can include information regarding, for example, a validity period for specifying how long the message remains valid before the SMSC will delete it; a time stamp for allowing the SMSC or the sender to track and control individual messages; a data coding scheme for indicating how the data is encoded within the message; a source and destination address of the message; and an address of the SMSC that handles the message.

External Short Message Entity (ESME)

An External Short Message Entity (ESME) is a network element external to a wireless carrier's network that can facilitate the reception and transmission of SMS messages via the SMSCs from an external source. The ESME typically represents a fixed network SMS client, such as a WAP Proxy Server, E-Mail Gateway, Voice Mail Server (VMS), Web-based messaging service, or e-mail integration service.

The VMS is responsible for receiving, storing, and playing voice messages intended for a user that is busy or not available to take a voice call. It is also responsible for sending voice-mail notifications for those users to the SMSC.

The web-based messaging ESME supports interconnections to the World Wide Web for the submission of messages and notifications.

The E-Mail Gateway delivers e-mail notifications and supports two-way e-mail, using an SMS-compliant terminal. The SMSC connected to this ESME must support interconnection to e-mail servers acting as message input/output mechanisms.

There are several other ESMEs which may submit SMS messages to the SMSC, and include, but are not limited to, paging networks, and specialized software for PC-based messaging.

Short Message Peer-to-Peer (SMPP) Protocol

The Short Message Peer-to-Peer (SMPP) protocol is an open industry standard messaging protocol that is widely deployed in the mobile telecommunications industry to simplify integration of data applications in the wireless mobile network.

The SMPP protocol provides a flexible data communications interface for the transfer of SMS messages between the ESMEs and MCs by establishing an SMPP session.

The SMPP protocol provides a means for the SMSC to transfer the SMS message to the MSC that serves the destination device. Furthermore, after the address of the MSC has been obtained, the SMPP protocol provides a confirmed delivery service.

Routing Entity (RE)

A Routing Entity (RE) is a network element that is used to route messages between MCs and between ESMEs and MCs. The RE has the ability to emulate the functionality of both an MC and an ESME so that to an ESME, the RE acts as an MC, and to an MC, the RE acts as an ESME. The REs are used to hide a network of MCs, thereby presenting only the REs as the external interface point for the ESMEs.

An SMPP Gateway is a type of RE that serves as a concentrated point of access for allowing multiple ESMEs to connect to an SMSC.

Mobile Originated (MO) Messages

A conventional method for sending SMS messages originating from a mobile device is described as follows. The SMS message can be delivered to a destination device which is not limited to a mobile device.

When the mobile device is powered on, it automatically registers with the wireless network via the HLR. After the mobile device user generates an SMS message and executes a send operation using the mobile device, the SMS message is delivered to the base station and then to the MSC. The MSC sends the SMS message to the SMSC, and the SMSC delivers the SMS message to the ESME via the SMPP Gateway. The ESME then forwards the SMS message to the appropriate receiving device. The SMSC acknowledges to the MSC the successful outcome of the message transfer, and the MSC subsequently returns the outcome of the operation to the message-originating mobile device.

Mobile-Terminated (MT) Messages

A conventional method for receiving SMS messages terminating at a mobile device is described as follows. The SMS message can originate from a device which is not limited to a mobile device.

The SMS message received in the ESME is transferred to the SMSC via the SMPP Gateway. The SMSC then interrogates the appropriate HLR and receives the routing information for the mobile device user to whom the message is directed. The SMSC sends the SMS message to the MSC, which retrieves user information from the HLR. The MSC then transfers the SMS message to the mobile device user, and returns to the SMSC the outcome of the operation, e.g., successful or failed delivery. If message delivery by the SMSC fails due to a temporary failure, e.g., the mobile device being unregistered, the SMS message is stored in the SMSC, and the SMSC requests the HLR to notify the SMSC when the indicated mobile device becomes available. If requested by the ESME, the SMSC returns a status report indicating delivery of the SMS message.

Incoming SMS messages can be stored in an application running on the mobile device, such as an SMS Inbox.

Instant Messaging (IM)

The ability to send and receive text messages using SMS is a popular function in mobile devices. Another message service is Instant Messaging (IM), a PC-based on-line messaging service that provides quick communication over the Internet via text messages, i.e., "instant messages." IM must be subscribed to separately from SMS. There are several IM services that each have an established community of users.

IM allows a user to maintain a list of people, e.g., "buddy list" or "contact list", with whom to interact. The user can exchange messages with any person on the contact list, thereby allowing for constant peripheral contact with family, friends, and co-workers. Sending an instant message opens up a small window in the user interface of each of the two communicating users where the users can type messages for viewing by both users. When two users are sending instant messages to each other, the users have established a "conversation". All of the messages sent during the conversation are displayed in each user's user interface so that each user may view the previously transmitted (sent or received)

messages. There may be a maximum limit to the number of previously transmitted messages displayed on the user interface.

IM Incompatibility

IM service providers, e.g., AOL, MSN, and Yahoo, provide separate IM services, e.g., AOL Instant Messenger, MSN Messenger, and Yahoo Messenger, respectively, which each use a proprietary protocol which is not understood by the other IM service providers. It is necessary to log in to each IM service separately, so that each user must maintain separate contact lists, settings, and other information for each IM service. Thus, each of the IM service providers require a separate application corresponding to the IM service(s) that will be run on the user's PC or mobile device.

Most of the popular IM services provide a variety of features, other than the ability to send instant messages, e.g., exchanging web links, images, sounds, and other types of files by sending them directly to other users.

Mobile Instant Messaging (MIM)

In order to be able to establish direct communication between SMS users and IM users, wireless service providers have established a system for allowing SMS users to connect to IM services. Mobile device users can send and receive SMS messages on their mobile devices to log in to an IM service and then send instant messages to PC or other mobile device users who are logged in to the same IM service.

Mobile Instant Messaging (MIM) is a messaging service that allows users to log in to an IM service using their mobile devices. However, in conventional mobile devices, users must download onto their mobile devices separate applications for each IM service. Therefore, the ability to use more than one MIM service provider requires a large amount of memory in the user's mobile device, since the user must download and run separate applications for each IM service.

SUMMARY OF THE INVENTION

The present invention is directed to a system for exchanging text messages between a mobile device and a plurality of IM services. The system includes an SMS-based MIM client that runs on a mobile device and provides a plurality of user interfaces for a plurality of respective IM services. A user of the mobile device can log in to one of the IM services using the MIM client, and the mobile phone user can use the MIM client to exchange text messages with users logged into the chosen IM service.

The MIM client replicates the key features of a desktop-based instant messaging client.

The present invention is also directed to a communications network for enabling users of mobile devices to exchange text messages with users logged in to a plurality of IM services. The communications network interfaces with a plurality of IM users logged into a plurality of IM services; an IM Gateway connected to each of the IM services; and an SMPP Gateway connecting the IM Gateway to a plurality of mobile device users.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which:

FIGS. 9A–9C are screen shots of conversation history windows and message editor windows of an MIM client, according to an embodiment of the present invention;

FIG. 10 is a chart of short code mappings for mobile-originated messages, according to an embodiment of the present invention;

FIG. 11 is an illustration of the syntax of a primitive transmitted from the MIM client to the IM Gateway, according to an embodiment of the present invention;

FIG. 12 is an illustration of the syntax of a primitive transmitted from the IM Gateway to the MIM client, according to an embodiment of the present invention;

FIG. 15 is an illustration of the syntax of a primitive transmitted from the IM Gateway to the MIM client for transferring presence updates, according to an embodiment of the present invention;

DETAILED DESCRIPTION OF THE EMBODIMENTS

Network Architecture

Figure 1:
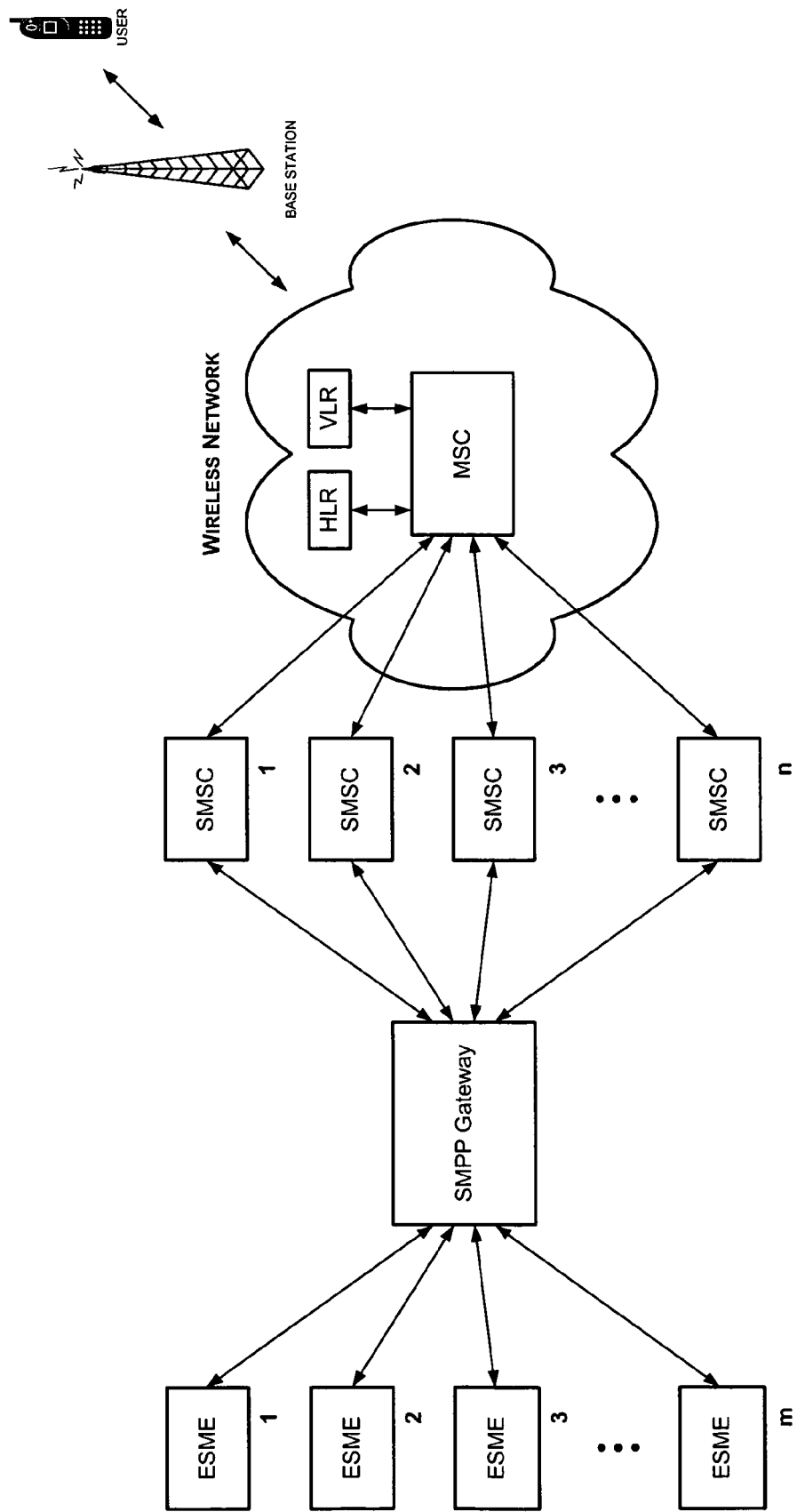
FIG. 1 is a block diagram showing the network architecture of a conventional communications network that is capable of transferring SMS messages.
Figure 2:
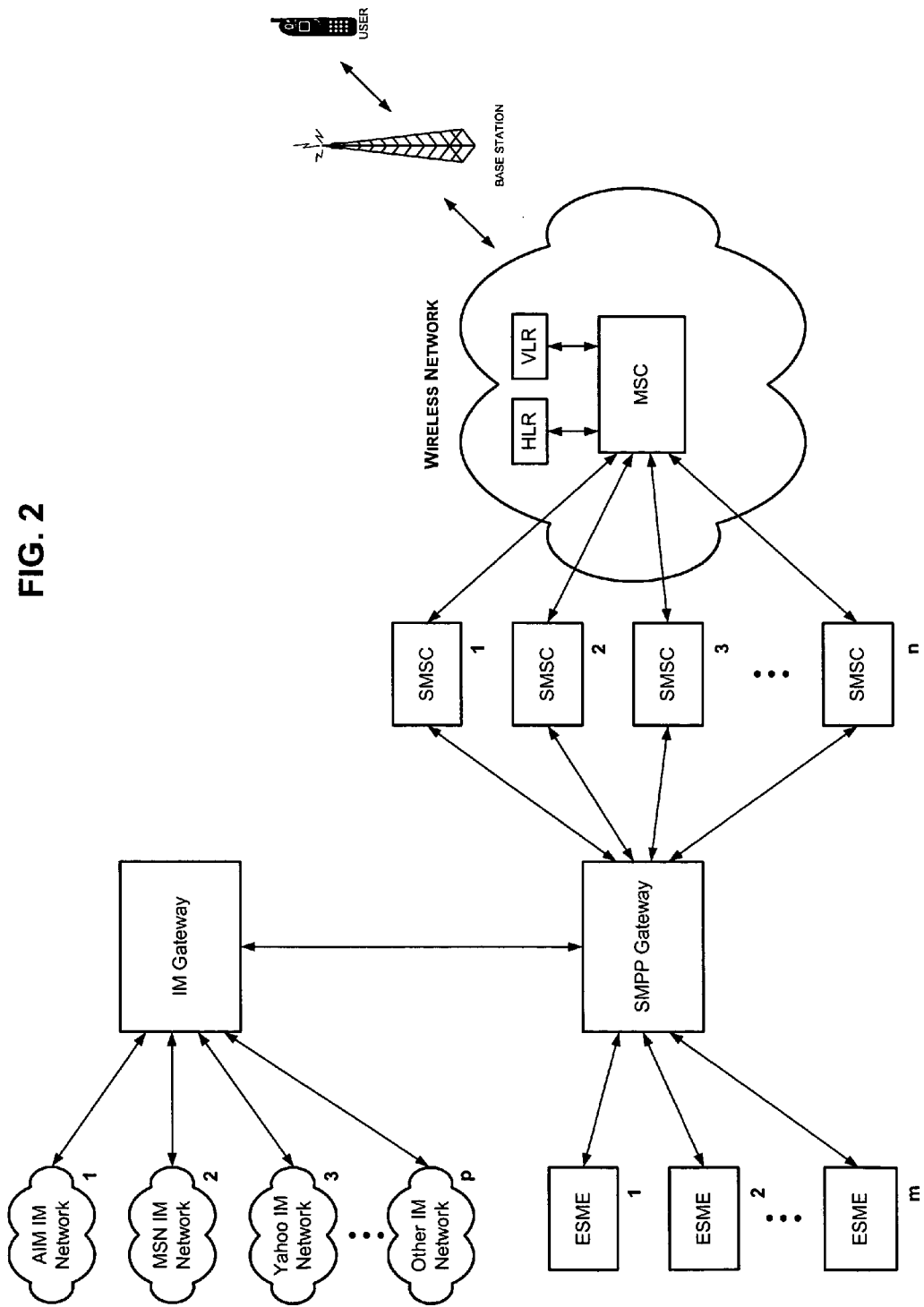
FIG. 2 is a block diagram showing the network architecture of a communications network, which includes an IM Gateway, according to an embodiment of the present invention.
Figure 3:
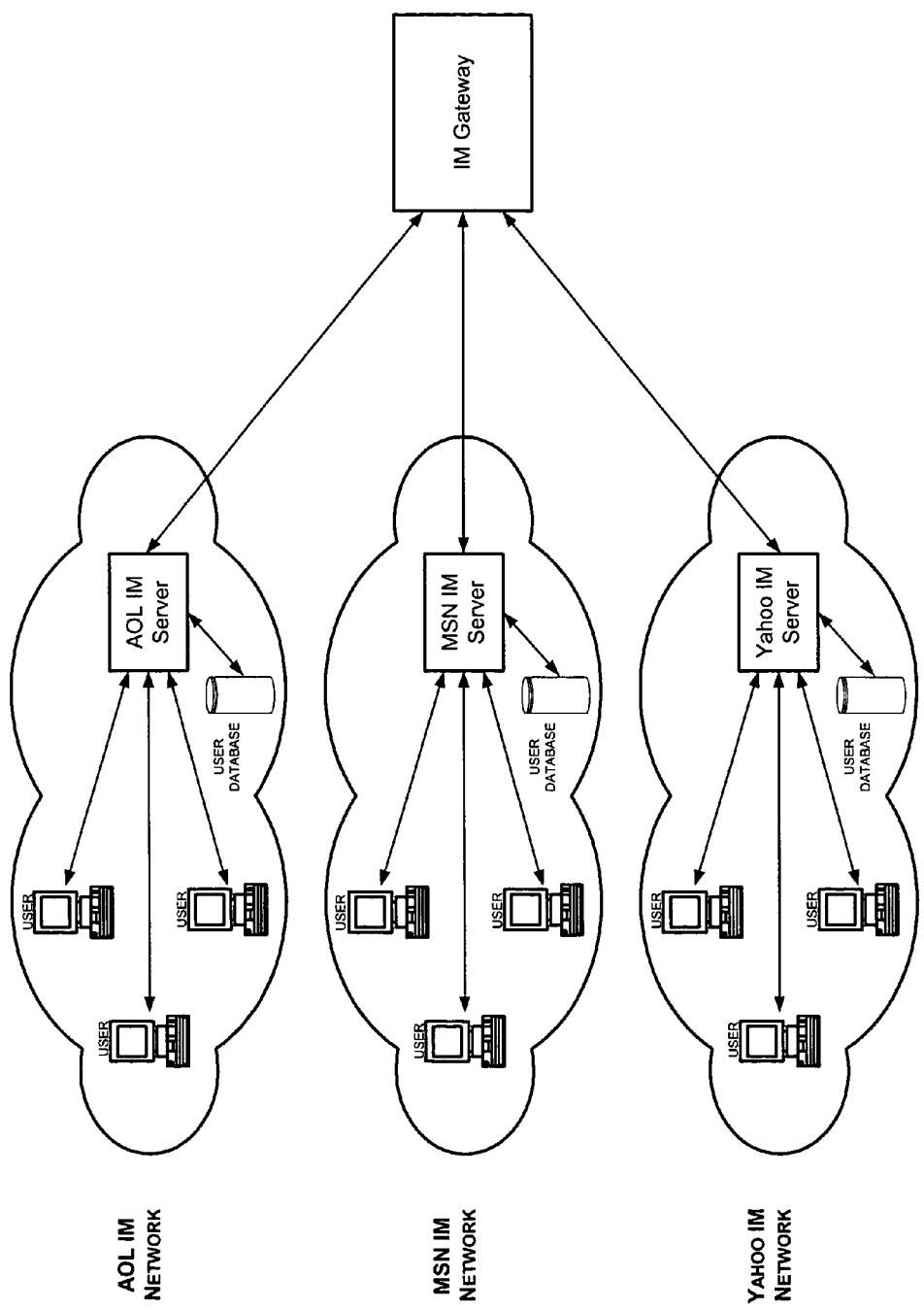
FIG. 3 is a block diagram showing the connection between various IM networks and the IM Gateway of FIG. 2.

The basic network architecture of a communications network utilizing SMS according to the present invention is shown in FIG. 2. The wireless communications network of FIG. 1 transfers SMS messages to and from the mobile device users, the base stations, the MSCs, the SMSCs, and the SMPP Gateway, as described above. In the present invention, an IM message can be carried in one or more of the SMS messages. FIG. 3 shows the connection to the various IM servers via an IM Gateway for transporting the IM messages.

As shown in FIGS. 2 and 3, according to the present invention, the IM servers are provided for each of the various IM service providers, e.g., AOL, MSN, Yahoo, and their respective IM services, e.g., AOL Instant Messenger, MSN Messenger, and Yahoo Messenger. The AOL, MSN, and Yahoo IM servers exchange IM messages between their respective IM networks and the mobile device users logged in to their chosen IM services. The IM messages are transported to mobile device users using SMS messages.

In the IM network, IM users logged in to the IM service are connected to an IM server corresponding to the particular IM network. The IM server authenticates users, relays messages between subscribed users, and maintains a user database that stores user information such as username and login status.

Runtime Environment

The present invention is directed to a MIM client that may be built using any API available on the mobile device, examples of such API's include BREW (Binary Runtime Environment for Wireless), Java, or native API provided by handset manufacturer. The MIM client is a single application for MIM on a mobile device that uses SMS to transport messages to the IM Gateway or to the IM service providers. The MIM client may be downloaded from a server over-the-air or may be preinstalled on the handset.

It is to be understood that one skilled in the art of programming can write the programming code required to build the MIM client or equivalent application capable of providing the features and functions described herein.

One Application with Multiple Interfaces

According to the present invention, the MIM client provides the ability to log in to multiple IM services. The MIM client provides multiple IM interfaces to the mobile phone user, thereby allowing the user to engage in instant messaging using the interface and selected IM service(s).

The MIM client provides user interfaces for each of the various IM services and their respective proprietary protocols. The MIM client provides separate interfaces for each of the different IM services to which the mobile device user can subscribe (log in, sign in). The user uses the interface that corresponds to a particular IM service to transfer IM messages with another user logged in to the same IM service. The MIM client allows mobile phone users to subscribe to at least one of the IM services using the separate interfaces that correspond to the IM services. After subscribing to an IM service, the mobile phone user can send and receive IM messages to and from other users who are logged in to the same IM service using their mobile devices or PCs. Thus, the MIM client of the present invention allows mobile device users and PC users to freely and easily communicate with each other over various IM networks.

The MIM client manages IM messages received from all of the IM services to which the user is logged in. The MIM client allows users to log in to different IM services and does not require the user to log off one IM service before logging on to another IM service. However, the MIM client will only allow the user to access one IM service user interface at a time. Furthermore, the MIM client allows the user to send IM messages using one interface corresponding to one IM service at a time.

The MIM client allows users to switch between IM services without logging out, re-starting the application, or losing session user data. For example, if a user is logged in to AIM and MSN and an IM message is received from AIM while the MIM client is interacting with MSN, the MIM client displays a message, e.g., "New AIM message received." Then, the MIM client prompts the user with the choice to either access AIM or ignore the new message. If the user chooses to ignore the new message, the ignored message is stored by the MIM client. If the user chooses to access AIM, the user does not have to log off of MSN before switching to the AIM user interface to read the new message.

In another example, if a user is logged in to MSN and logged out of AIM and an IM message is received from AIM, the MIM client displays a message, e.g., "New AIM message received." Then, the MIM client prompts the user with the choice to either log in to AIM or ignore the new message. If the user chooses to ignore the new message, the ignored message is stored by the MIM client. If the user chooses to log in to AIM, the user does not have to log off of MSN before switching to the AIM user interface to log in and read the new message.

The MIM client also offers a help menu that is common to all IM user interfaces. The help menu describes basic usage for the MIM client and any MIM client settings and personalization. For example, the help menu can describe how the user can access each IM service. Additionally, the help menu can provide information for each IM service regarding MIM client usage, including but not limited to, sign-up, login, logout, contact list management, sending/receiving messages, and adding/deleting/blocking contacts.

IM Gateway

The IM servers generate IM messages to be transferred to the mobile device user. The IM messages are transferred in a non-SMS format to the IM Gateway to be converted into a SMS format and transferred to the mobile device user.

FIGS. 2 and 3 show an embodiment of the present invention in which an IM Gateway is included in the communications network. The IM Gateway is a network element that is used to route messages between the SMPP Gateway and the IM servers in the IM networks. The IM Gateway also manages the assignment of addresses for messages to and from the MIM client.

Figure 4:
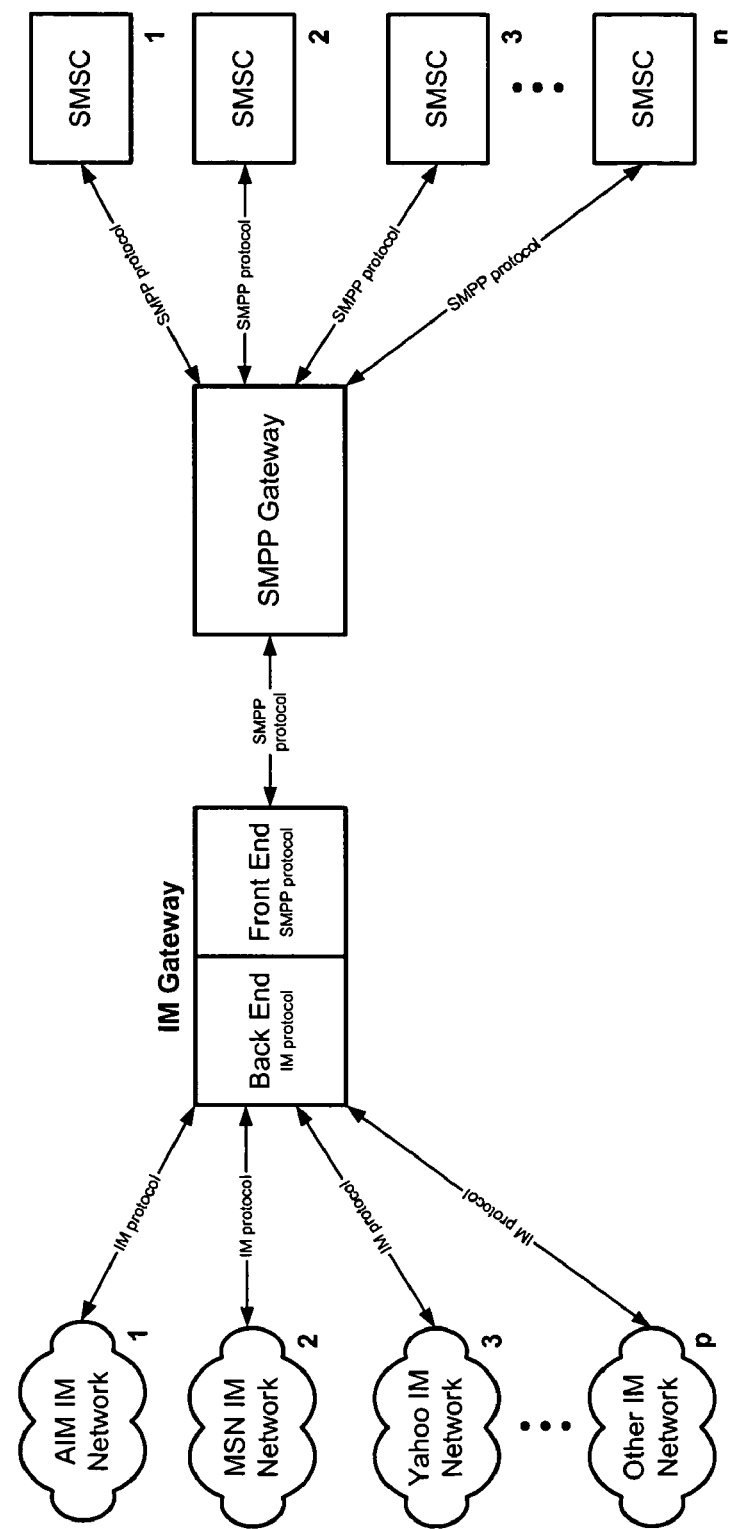
FIG. 4 is a block diagram showing the connection of the IM networks and SMPP Gateway to the IM Gateway of FIG. 2.

FIG. 4 shows the connection of the IM Gateway to the SMPP Gateway and the various IM networks. The IM Gateway includes a front end and a back end. The front end of the IM Gateway communicates with the SMPP Gateway using the SMPP protocol. The IM Gateway exchanges SMS messages with the MIM client via the SMPP Gateway and SMSCs using the SMPP protocol. Thus, the front end of the IM Gateway can serve as an ESME to receive and send SMS messages via the SMSCs.

The IM Gateway is used as a concentrated point of access to the SMPP Gateway to hide a network of IM servers, thereby presenting only the IM Gateway as the external interface point for the SMPP Gateway.

Messages originating from the MIM client have a predefined range of short-codes as the destination address. The SMPP gateway is configured to route messages with these short-codes to the IM Gateway. The IM Gateway extracts information from each SMS message and transmits an IM service-specific message to and from the intended IM services.

IM Service Proprietary Protocol

The back end of the IM Gateway communicates with the various IM networks using an IM protocol. Also, the MIM client must send separate login requests to each IM service, and each login request is formatted to be recognized by the IM service that is intended to receive the request. Multiple IM services may use a similar protocol.

It is known that IM services, such as AOL and Yahoo, use the Wireless Village protocol, which is an open industry specification that supports a variety of instant messaging and presence services features. This protocol can also be customized to adapt it for use with the present network.

Other IM services, such as MSN, use a proprietary protocol specific to the particular IM service. Such a specialized protocol can also be customized to adapt it for use with the present network. Regardless of the protocol, the IM Gateway is capable of performing IM service-specific translations.

For each message that originates from the mobile device and is transmitted to one of the IM services, the IM Gateway formats the message so that it can be read by the IM service that is intended to receive the message according to the particular IM service-specific protocol. Thus, the IM Gateway is capable of providing IM service-specific protocol translations for each IM service that corresponds to the IM interfaces provided by the MIM client.

If an IM Gateway is provided in the communications network, as shown in FIG. 24, some or all of the functionality of the mobile device can be transferred from the mobile device to the IM Gateway. For example, the IM Gateway can provide the IM service-specific protocol translations that permit the mobile device users to exchange text messages with the users of the various IM services, so that the IM service-specific protocol translation functionality is not required to be in the MIM client, thereby reducing the necessary amount of memory space for the MIM client in the mobile device. The IM Gateway is also capable of providing protocol translations for a login request or logout request received from the MIM client and transmitting appropriate login requests or logout requests to the intended IM services. Other examples of the functionality that may be provided by the IM Gateway are described below.

Alternatively, some of the IM service-specific translations can be provided by the MIM client. The MIM client in the mobile phone can provide the functionality to translate part of an SMS message that is generated by the user to the proper format so that the information transferred in the SMS message can be recognized and read by the IM service. Thus, the MIM client is capable of handling the protocols of all the IM services to which the user intends to subscribe, including proprietary protocols, and the MIM client can provide IM service-specific protocol translations between the mobile device and each of the IM services.

First Time Set-Up Wizard

After the mobile device user has first downloaded the MIM client, the MIM client presents the user with a "wizard," which is an interactive user interface component that leads the user through a configuration process in a step-by-step fashion. The wizard guides the user through the first time user set-up of the MIM client.

After running the MIM client for the first time, the wizard can be available as an item in the help menu offered by the MIM client and can illustrate the main features of the MIM client including, but not limited to, login, logout, composing and sending a message, and changing status.

Figure 5:
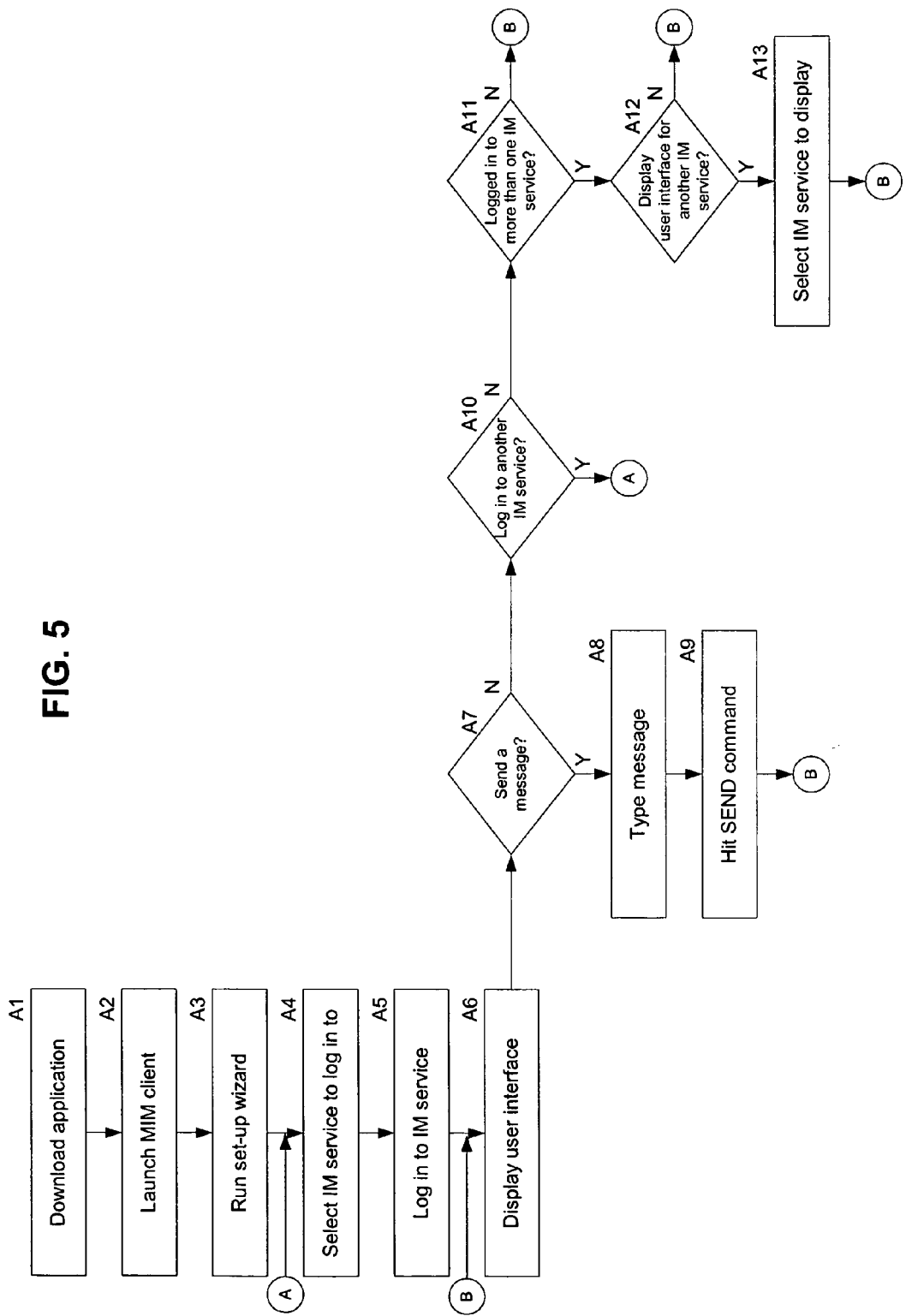
FIG. 5 is a flow chart of a control program of an MIM client in a mobile device communicating with an IM Gateway, according to an embodiment of the present invention.

FIG. 5 shows a flow chart of the process that the MIM client executes as it is run by the user for the first time, according to an embodiment of the present invention. However, the steps of the process described below with reference to FIG. 5 can be modified, for example, by changing the order of the steps, by including additional steps as known in the art, or by removing some of the steps.

In step A1, the user initiates downloading of the MIM client application onto the user's mobile device from a server maintained by the MIM provider.

In step A2, the user launches the MIM client using the mobile device to which the MIM client was downloaded.

In step A3, the MIM client presents the user with the set-up wizard described above and the user proceeds to set up the downloaded MIM client. The user can also be presented with an option to bypass the wizard.

Figure 6:
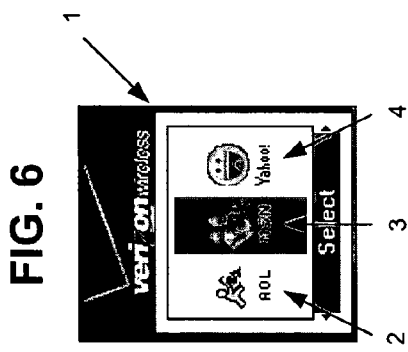
FIG. 6 is a screen shot of a service selection screen of an MIM client, according to an embodiment of the present invention.

FIG. 6 is a screen shot of a service selection screen 1 of the MIM client, according to an embodiment of the present invention. After ending the wizard, the user is presented with the service selection screen 1, which prompts the user to select an IM service to log in to. The service selection screen 1 presents icons for each IM service provider, e.g., AOL, MSN, Yahoo. The service selection screen 1 shown in FIG. 6 presents the icons, e.g., the AOL icon 2, the MSN icon 3, and the Yahoo icon 4, horizontally. The user can log in to one IM service or can log in to multiple IM services in any order chosen by the user, since the user logs in to each IM service by selecting each IM service one at a time. The process described and shown in FIG. 5 is directed to the MIM client when it is used to log in to one or more IM services separately.

Referring back to FIG. 5, after step A3, the MIM client prompts the user in step A4 to select a first IM service to log in to, for example, by pressing arrow buttons provided on the mobile device. When the user selects an IM service to log in to, the user is not already logged in to the particular IM service.

Login

Figure 7C:
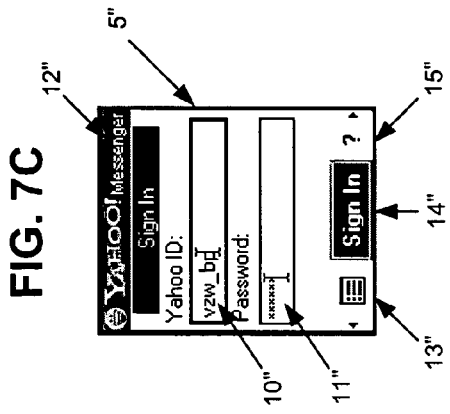
FIGS. 7A–7C are screen shots of login screens of an MIM client, according to an embodiment of the present invention.
Figure 7B:
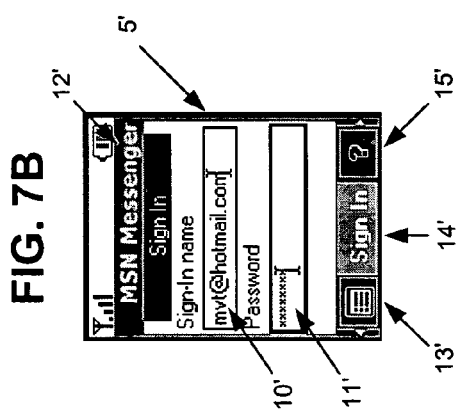
Figure 7A:
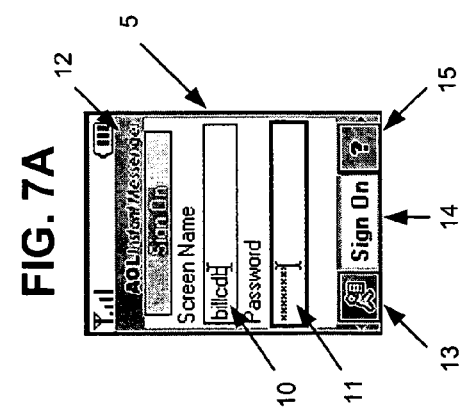

In step A5, the MIM client presents the user with a login screen associated with the IM service selected by the user. FIG. 7A is a screen shot of an AOL login screen 5 belonging to an AOL user interface, FIG. 7B is a screen shot of a MSN login screen 5' belonging to a MSN user interface, and FIG. 7C is a screen shot of a Yahoo login screen 5" belonging to a Yahoo user interface, according to an embodiment of the present invention. The MIM client only allows the user to access one IM service user interface at a time. Therefore, in this embodiment of the present invention, the user logs in to each IM service separately.

The login screen 5 (or 5', 5") provides a user name (screen name, login name) prompt 10 (or 10', 10") and a password prompt 11 (or 11', 11") for the user to enter the user's existing username and password for the particular IM service. For all text entry fields, the MIM client provides the user with the standard text entry modes available in the native BREW client, e.g., alpha, numeric, T9. The password field is masked so that the characters entered by the user for the password are displayed using a symbol such as "*".

The MIM client allows the user to save the user's specific usernames and passwords for each service provider. The username and password can be saved in an encrypted form using the MD5 algorithm. However, the user can disable this option so that the user must enter the username and password for each service provider each time the user launches the MIM client. The MIM client can permit the user to store and switch between different user names/passwords for each service provider if this option does not violate any service provider agreements. Furthermore, the MIM client can permit the user to delete usernames/passwords that were previously stored.

The top of the login screen 5 (or 5', 5") shows a title bar 12 (or 12', 12") with the name of the IM service for the particular login screen 5 (or 5', 5"). The bottom of the login screen 5 (or 5', 5") includes an options menu icon 13 (or 13', 13") for enabling the user to access various features, as described below; primary action text 14 (or 14', 14") for identifying the primary action of the user, e.g., login, send; and a help menu icon 15 (or 15', 15"), e.g., a question mark, for enabling the user to access the help menu.

Contact List

Figure 8C:
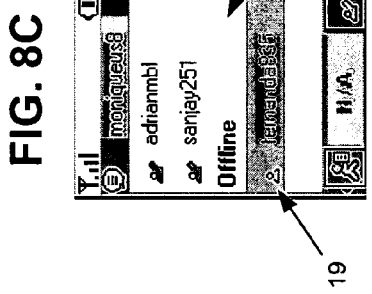
FIGS. 8A–8E are screen shots of contact list screens of an MIM client, according to an embodiment of the present invention.
Figure 8B:
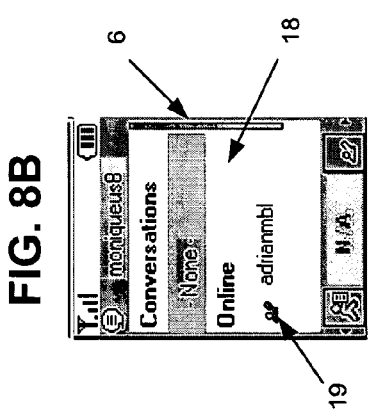

In step A6, the MIM client presents the user with the user interface specific to the particular IM service that the user logged in to. The user interface includes a contact list (buddy list) that indicates the status information for each of the user's contacts. FIG. 8A is a screen shot of an AOL contact list screen 6, FIG. 8B is a screen shot of a MSN contact list screen 6', and FIG. 8C is a screen shot of a Yahoo contact list screen 6", according to an embodiment of the present invention.

The contact list screen 6 can include various features such as the title bar 12, the options menu icon 13, the primary action text 14, a conversation key 16, a user status icon 17, and a contact list 18. The title bar 12 of FIG. 8A indicates the user name (moniqueus8). The contact list screen 6' includes similar features denoted with a prime (') , and the contact list screen 6" includes similar features denoted with a double prime (").

The MIM client allows the user to have multiple conversations at the same time with different contacts. The conversation key 16 allows the user to view a conversation history window 7 for an open conversation, as described below and shown in FIGS. 9A–9C.

The user status icon 17 indicates, for example, which IM service and corresponding user interface the user is using at the time.

The contact list 18 provides a list of contacts chosen by the user. The contacts listed on the contact list 18 are each identified by a contact status icon 19 and a user name or friendly name, i.e., a more familiar name that the user can assign to the particular contact so that the particular contact can be listed on the contact list 18 by the friendly name rather than the user name. The contact status icon 19 identifies whether the particular contact is online or offline, and if the contact is online, the contact status icon 19 can further identify whether a new message has been received from the particular contact, whether the particular contact is logging on, whether the particular contact is away, whether the particular contact may be offline, and whether the user has rejected messages from the particular contact.

While the user is logged in to more than one IM service, the MIM client maintains all session data between the user and the user's contacts for each IM service. Session data for the users listed on the contact list can be regularly updated (refreshed). The MIM client allows the user to subscribe for an automatic update (refresh) of the contact list continuously after a predetermined time interval, e.g., five minutes, an hour, etc. The IM server manages these subscriptions, requests updates from the IM service, and delivers the updates to the mobile device.

Alternatively, the MIM client can prompt the user with the option to automatically subscribe to receive an alert notification when a contact goes online for every contact on the user's contact list. The user is also able to generate a mobile-originated message to the IM service to refresh the contact list.

According to one embodiment, the MIM client segregates contacts between IM services by providing separate contact list screens 6 for each IM service and does not display blended contact lists from multiple IM services in the same user interface. The user maintains the contact list by adding and removing contacts from each of the lists. Furthermore, if the user receives a message from a contact who is not represented on the user's contact list 18, the contact can be automatically added to the contact list 18. Alternatively, the MIM client may maintain a single, blended contact list of contacts from multiple IM services.

The user is able to use, for example, arrow keys provided on the mobile device, to scroll through the contact list 18. For example, FIGS. 8A–8C show the contact list screen 6 at different times as the user scrolls down the contact list 18. In FIG. 8A, the user can view the top of the contact list 18; in FIG. 8B, the user can view the middle of the contact list 18 of FIG. 8A; and in FIG. 8C, the user can view the end of the contact list 18 of FIG. 8A. The shaded area highlights the line to which the user has scrolled.

The contact list 18 shown in FIG. 8A is divided into a list of conversations, a list of online contacts, and a list of offline contacts. The list of conversations under the header "Conversations" indicates the contacts listed on the user's contact list 18 with which the user is engaged in a conversation. The conversation list shown in FIGS. 8A and 8B indicates that the user is not engaged in any online conversations by showing "-None-". The conversation list allows the user to switch between different open conversations and provides the user with a visual indication for conversations with unread messages and conversations with no unread messages.

The list of online contacts shown in FIGS. 8A–8C under the header "Online" indicates the contacts listed on the user's contact list 18 who are online (adrianmb1, sanjay251). The list of contacts shown in FIG. 8C under the header "Offline" indicates the contacts listed on the user's contact list 18 who are offline (fernanda835).

Figure 8E:
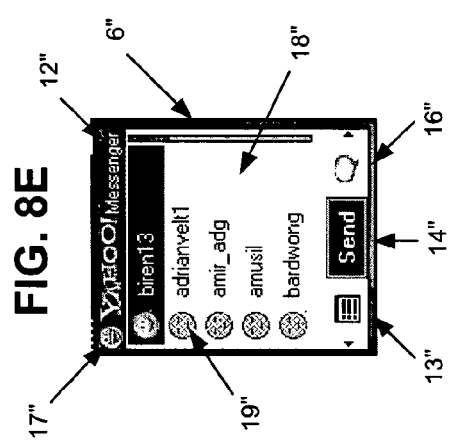
Figure 8A:
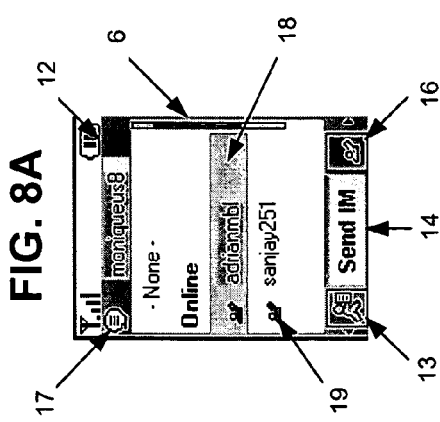
Figure 8D:
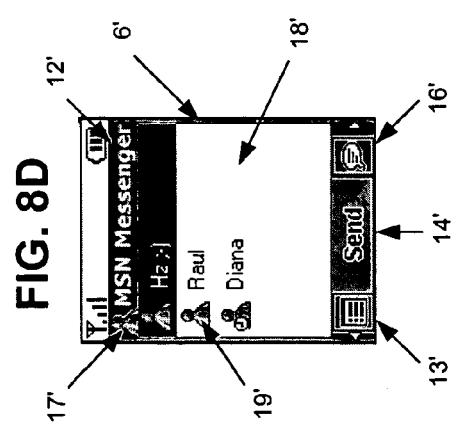

Alternatively, as shown in FIGS. 8D and 8E, the contact list screen 6' (or 6") can include a contact list 18' (or 18") that is not divided into separate lists, and the user is notified of the status of the user by the contact status icons 19' (or 19") next to the user names.

Additionally, the MIM client allows the user to browse the mobile device's address book stored in the mobile device when composing and addressing a message using the MIM client. Information on contacts listed in one of the contact lists 18, e.g., user name or friendly name for any applicable IM service, can be stored with other types of information in the mobile device's address book.

Sending Messages

The MIM client permits the user to compose and send messages as well as receive and view messages from contacts. In step A7, the MIM client determines whether the user has indicated whether a message is to be sent. The user initiates sending a message by highlighting the contact to which the message is to be sent and pressing a button on the mobile device to select the contact, e.g., SEND or OK. If the user has initiated sending a message, the MIM client proceeds to step A8; if not, the MIM client proceeds to step A10, as shown in FIG. 5.

FIG. 8A shows the contact list screen 6 when the user has selected an online contact for sending a message. The primary action text 14 shows "Send IM," thereby indicating that if the user presses a button on the mobile device, e.g., SEND or OK, then the user can send a message to the particular contact.

In step A8, the MIM client provides a message editor, which is presented as a separate window 8 (FIG. 9A) for the user to compose a message to the selected contact. The message editor window 8 is usually about one or two lines and is separate from the conversation history window 7, but is displayed at the same time as the conversation history window 7. FIG. 9A is a screen shot of an AOL conversation history window 7 and message editor window 8, FIG. 9B is a screen shot of a MSN conversation history window 7' and message editor window 8', and FIG. 9C is a screen shot of a Yahoo conversation window 7" and message editor window 8", according to an embodiment of the present invention. The conversation history window 7' and the message editor window 8' include similar features denoted with a prime ('), and the conversation history window 7" and the message editor window 8" include similar features denoted with a double prime ("). At the bottom of the screen, the primary action text 14 shows "Write," thereby indicating that the user can compose messages using the message editor window 8.

In step A9, after the user has typed the message into the message editor window 8, the user presses the SEND button on the mobile device to send the message to the contact. The outgoing message is then displayed in the conversation history window 7.

The user can scroll through the conversation history window 7, which displays the conversation history between the user and the selected contact with the messages sent by the user in one color and the messages sent by the contact in another color. The messages are displayed in the order in which they are sent and received by the user. The MIM client can limit the number of messages displayed in the conversation history for each conversation, e.g. 10. If the user already had the maximum number of messages and receives a new message, the oldest message in the conversation will be removed from the display. Furthermore, the MIM client can show a minimum number of messages in the conversation history, e.g., 6. The MIM client maintains a conversation history until the user logs off from the IM service or ends the conversation. The user can save conversations and delete saved conversations.

The MIM client can prefix each message in the conversation history window 7 with the user name or friendly name of the sender of each message. Alternatively, the MIM client can display the contact's user name or friendly name in the title bar 12' (or 12"), as shown in FIGS. 9B and 9C, and prefix each message with arrows that indicate whether the messages are incoming or outgoing, as shown in FIGS. 9A–9C.

After sending the message, the MIM client returns to step A6 to display the user interface for the first IM service. Then, the MIM client determines whether the user is initiating the send operation for another message in step A7. If so, the MIM client repeats the process described above for steps A8 and A9. If not, the process continues to step A10 where the MIM client determines whether the user is initiating a login operation for a second IM service.

If the user initiates a login operation for a second IM service, the MIM client returns to step A4; if not, the MIM client proceeds to step A11, as shown in FIG. 5.

In step A11, the MIM client determines if the user is logged in to more than one IM service. If so, the MIM client proceeds to step A12; if not, the MIM client returns to step A6 to display the user interface for the most recently used IM service. At this time, since the user has only logged in to the first IM service, the MIM client returns to step A6 to display the user interface for the first IM service, which is the only IM service that the user is logged in to.

Step A4 for selecting an IM service to log in to can be executed as many times as there are IM services that the user can log in to. The user is not required to log off one service provider before logging in to another. In step A4, the MIM client prompts the user to select the second IM service to log in to. The following description of the second IM service can also apply to a third IM service, a fourth IM service, etc. The user can select the IM service by accessing the service selection screen 1, for example, by selecting the options menu icon 13 (or 13', 13") and selecting a specific option for logging in to another IM service using the service selection screen 1. The user can then select and subsequently log in to an IM service that the user is not already logged in to. IM services that the user is already logged in to can be displayed in a shaded manner to indicate to the user that the IM service has already been logged in to.

Then, in step A5, the MIM client presents the user with the service login screen 5 for the second IM service selected by the user.

The functions available to the user through the MIM client for the second IM service are similar to those available for the first IM service, as described above. After logging in to the second IM service in step A5, the MIM client proceeds to step A6 to display the user interface including the contact list of the second IM service, as shown in FIG. 5.

In step A7, the MIM client determines whether the user has indicated that a message is to be sent using the second IM service. If the user has initiated sending a message, the MIM client proceeds to step A8; if not, the MIM client proceeds to step A10, as shown in FIG. 5.

In step A8, the MIM client provides a message editor window 8 and conversation history window 7 for the second IM service.

In step A9, after the user has typed the message into the message editor window 8, the user sends the message to the contact using the second IM service.

After sending the message, the MIM client returns to step A6 to display the user interface for the second IM service. Then, the MIM client determines whether the user is initiating the send operation for another message in step A7. If so, the MIM client repeats the process described above for steps A8 and A9. If not, the process continues to step A10 where the MIM client determines whether the user is initiating a login operation for another IM service.

If the user initiates a login operation for another IM service, the MIM client returns to step A4 and repeats the steps described above; if not, the MIM client proceeds to step A11, as shown in FIG. 5.

In step A11, the MIM client determines if the user is logged in to more than one IM service. If so, the MIM client proceeds to step A12; if not, the MIM client returns to step A6 to display the user interface for the most recently used IM service. At this time, since the user has logged into at least the first and the second IM services, the MIM client proceeds to step A12, as shown in FIG. 5, to determine the IM service that the user would like to use so that the MIM client can determine which user interface to display.

In step A12, after the MIM client has determined that the user is logged in to more than one IM service, i.e., at least the first and the second IM services, the MIM client determines which IM service the user would like to use. If the user chooses to use an IM service other than the one that the user most recently used, the MIM client proceeds to step A13 to allow the user to select the IM service to use. If the user chooses to continue using the same IM service, the MIM client returns to step A6 to display the user interface for the most recently used IM service.

In step A13, the user selects another IM service, for example, by selecting the options menu icon 13 (or 13', 13"), which can list the names of all of the IM services that the user is presently logged in to. The user can then select one of the listed IM services to view the user interface for the selected IM service.

Then, the user proceeds to switch freely between the first, second, third, etc., IM services to send and receive messages, while the MIM client follows a process similar to that shown in FIG. 5 and described above.

Thus, the user is able to toggle between contact lists of the IM services to which the user is logged in. When the user wants to send a message to a contact on the contact list, the user can select the contact's name using the scroll-down menu. After selecting the contact's name, the user is prompted to type the text message. Since the user selected the contact using the contact list provided by an interface of the MIM client that corresponds to a particular IM service, the MIM client addresses the SMS message to the IM Gateway, which then formats the message specifically for the intended IM service. The user does not have to input any information for routing the IM message containing the text message to the intended IM service.

Receiving Messages

Any time after the user has logged into an IM service, the user can also receive a message from another user of that service. The MIM client alerts the user when a new message has been received. The MIM client allows the user to modify the way the MIM client alerts the user that a new message has been received. The following are examples of how the user may be alerted to a new message.

If the user is viewing the conversation history window 7 for a contact and the incoming message is from the same contact, then the message appears in the conversation history window 7. Thus, when the user is editing a message to a contact and a new message arrives from the same contact, the user is not interrupted.

If the user is in a conversation with a contact and an incoming message is from a different contact, the user is informed of the new message, but is not prompted to view the message or ignore the message. Thus, the user is not interrupted during the conversation with the first contact.

Additionally, the MIM client can display an icon (not shown), e.g., on the title bar 12, when a new message has been received.

Not Running the MIM Client

If the MIM client is not running when a new message arrives, the user can be prompted to view or ignore the new message. If the user selects the view option, the MIM client will be launched and the user will be prompted to log on to the appropriate IM service to view the message and engage in the conversation with the contact. If the user selects the ignore option, the MIM client will not be launched and the message will be stored on the mobile device so that the user will be notified of the stored message when the user launches the MIM client. For example, the user can be notified of the stored message by a message pending icon as the contact status icon 19.

Messages

The MIM client and the IM Gateway support Wireless Village primitives specified by the Wireless Village protocol, as described in "The Wireless Village Initiative: Command Line Protocol Version 1.1 [WV-031]" of the Wireless Village Version 1.1 Specifications, Jul. 31, 2002, (http://www.openmobilealliance.org/WirelessVillage/docs/WV_CLP_v1.1.pdf), which is herein incorporated by reference. Wireless Village primitives are common protocol elements or statements that are recognized by systems that support the Wireless Village System Architecture and Command Line Protocol.

For example, the MIM client supports the following Wireless Village primitives: Login Request, LoginResponse, LogoutRequest, LogoutResponse, Disconnect, UpdatePresence, Presence-Notification, Subscriber-Presence-List, IMRequest, IM, IM-Msg-Delivery, Get-List, Get-List-Response, Add-List-Member, Add-List-Member-Response, Remove-List-Member, Remove-List-Member-Response, Friend-Request, Accept, Deny, Add-Block, and Add-Block-Response.

Mobile-Terminated (MT) Messages: Headers

Messages are transferred in SMS format (using the SMPP protocol as necessary) between the IM Gateway and the MIM client and include a message body and address information. The message body includes the substance of the message, such as message text, user name, password, and/or presence information, described below. The addressing information includes phone numbers or short codes corresponding to the sender and receiver of the message.

Mobile-terminated (MT) messages, e.g., LoginResponse, LogoutResponse, Disconnect, Presence-Notification, IM, and IM-Msg-Delivery, are received by the MIM client of the present invention and have a message body that is prefixed with a header (prefix), "//<text string>", where <text string> is the tag. The MIM client only receives messages that are prefixed with the header. The header determines how the incoming message is to be handled. Standard non-IM SMS messages do not include the header at the start of the message body. If the mobile device receives an SMS message without the header, then the mobile device reads the SMS message as a non-IM SMS message. The IM server applies addressing rules to all mobile-terminated messages it processes, and the IM server will add the header to all mobile-terminated messages.

The header is an OEM (original equipment manufacturer) header used for routing the message to the MIM client. For example, the header can be "//MIM:xxx" or "//BREW:xxx", where "//MIM" and "//BREW" allow the messages to be recognized by the MIM client and "xxx" represents routing information for directing the messages to the proper MIM client, as determined by a routing specification recognized by the IM Gateway and the MIM client.

Additionally, the header is followed by additional information, such as a provider ID, e.g., "1" for AOL, "2" for Yahoo, and "3" for MSN, a transaction ID, a message number, a total number of messages in the transaction, a session ID, or any other information to be communicated between the user and the IM service.

Mobile-originated messages received from the IM service (while the user is logged in to the IM service) must include the header in order to be accessed by the MIM client. The MIM client can use at least two mechanisms to access incoming messages. First, as described above, the MIM client can be configured to receive messages prefixed by a predetermined tag specific to the client software, e.g., //BREW. An incoming message with the header //BREW automatically activates the MIM client if the MIM client is not running, even during a phone call. Second, as described above, the MIM client can be configured to receive messages for a particular telecommunications service type. The format of this tag can be modified as long as it can be recognized by the MIM client. Thus, the tag can be generic as long as the IM Gateway and the MIM client are configured to recognize, issue, and process the tag.

When the MIM client is not launched or is suspended and an incoming message, which includes the header, is received, the MIM client displays "New [<tag>] message received." Then, the MIM client prompts the user with the choices to log in to the IM service specified by the header tag, if the header tag identifies a specific IM service, or to ignore the message. The MIM client can be automatically launched for certain types of headers, based on the header and the mobile device user's preference.

For example, when the MIM client is active and the mobile device user receives a message with the header //MIM, the MIM client can display the appropriate logo corresponding to the IM service specified in the message, can display "New MIM message received," and can automatically show the message or prompt the user to ignore the message.

After downloading and installing the MIM client, a registry is installed in the mobile device so that the mobile device can recognize headers for messages that are directed to the MIM client. For example, when the MIM client is installed onto a mobile device running BREW, a module information file (MIF) can be modified or saved onto the mobile device. The MIF can be used by BREW to recognize and identify the header tags, if available, in all incoming SMS messages.

Depending on the user's preference, the MIM client can be configured to handle all incoming messages, including non-IM SMS messages. Incoming messages can be saved with non-IM SMS messages in the SMS Inbox.

Furthermore, the MIM client can use sounds or vibrations to notify the user of events, such as incoming messages.

Mobile-Originated (MO) Messages: Addressing with a Short Code

Mobile-originated messages, e.g., LoginRequest, LogoutRequest, UpdatePresence, Subscriber-Presence-List, and IMRequest, can be addressed to the appropriate IM service using a 10-digit phone number stored in the MIM client. Additionally, short codes can map a short phone number to a longer phone number or e-mail address. The short codes can be used to exchange SMS messages with an automated application provided by the IM Gateway or a separate ESME, such as for information retrieval, TV and radio voting, direct response marketing and purchasing of goods or services. The short code can include any number of digits and is preferably four digits long, rather than the 10-digit numbers used in person-to-person messaging and voice calls.

The IM Gateway can add prefixes to mobile numbers, if necessary, and can convert between short codes and assigned IM Gateway addresses. The MIM client in the mobile device can store the short codes for addressing IM messages directed to the individual IM services. Alternatively, the short codes can be stored in the IM Gateway, which can direct the IM messages to the intended IM service.

Short codes can also be longer than 10 digits, such as when short codes are used to represent different functions. FIG. 10 shows an example of short code mappings for mobile-originated messages where a different 12-digit short code represents a particular function for a particular IM service.

The short code mappings provide an individual short code depending on the IM service that the message is directed to and a particular action (command) to which the message corresponds, e.g., adding a contact, adding a block to a contact, accepting a contact, and denying a contact. The MIM client stores the codes for each IM service. When the user sends messages using the MIM client, the user does not have to specify the short code corresponding to each of the IM services or functions for sending the messages. Thus, the MIM client can send messages to the appropriate IM servers without prompting the user to enter short codes each time.

Furthermore, the actions are assigned acronyms, which are typically 1–2 letters, and the acronyms are provided at the start of the message. Thus, the intended action of each mobile-originated message can be determined by the short code to which the message was addressed and by the acronym at the start of the message. The dual assignment of the short code and the acronym ensures that the message will be recognized correctly by the IM Gateway.

FIG. 11 shows an example of the composition of a mobile-originated login request message. The login request is transmitted to the IM Gateway so that the user can log in to a specific IM service. The login request begins with the acronym "LI" for a login, as shown in FIG. 10. The acronym is followed by the version of the MIM client, the session ID, the user name of the user, the password of the user, and an indication of whether the user would like to subscribe to notifications or presence updates.

When the user logs into an IM service, the user simply enters the user name and password in the log in screen. The MIM client composes the message with the user name and password to be sent to the IM service. FIG. 11 shows examples of login request messages composed by the MIM client. The AOL Login Request (LI 1.1.2.13a 9 vzwuser secret 0) and the MSN Login Request (LI 1.1.2.13a 1 vzwuser@3 secret 0) use the same acronym (LI), MIM client version number (1.1.2.13a), password (secret), and notification subscription identifier (0). The IM Gateway differentiates between the IM service for which the login request is intended based on the short code to which the login request is addressed.

The notification subscription identifier indicates whether the user wants to be subscribed to presence updates for the user's contacts. When the option is enabled on the IM server, the IM server sends all saved presence updates. The user chooses to enable or disable this option when logging in; however, the user can change the option after logging in.

The session ID differs between IM services since a separate session is opened between the user and each of the IM services. In the examples shown in FIG. 11, the AOL session is identified by session ID 9 and the MSN session is identified by session ID 1. Some IM services, such as MSN as shown in FIG. 11, require domain name information with the username. The domain name information can be added to the message automatically by the MIM client. Furthermore, the domain name information can be simplified, for example, so that "aol.com" is represented by a "1", "yahoo.com" is represented by a "2", and "msn.com" is represented by a "3".

Mobile-Terminated Messages: Addressing With A Short Code

Short code mappings for mobile-terminated messages can have a similar format with the header at the start of the message and an action may be assigned an acronym and a separate short code, from which the message originates, for each of the IM services. An example is shown in FIG. 12 for a login response sent from the IM Gateway to the MIM client.

The LoginResponse primitive and example of FIG. 12 includes the header (//BREW) and routing information (xxx), provider ID (3, for MSN), transaction ID (1), message number (1), total number of messages in the transaction (1), session ID (5), command ID (acronym, LI, for Login or Login Response), status code (0, for success), user ID for a first contact of the contact list (combp@2, for combp@yahoo.com), presence code for the first contact (1, for online), length of a friendly name of the first contact in bytes (10), the friendly name of the first contact (Biren-Phone), user ID for a second contact (shaider2000@2, for shaider2000@yahoo.com), presence code for the second contact (1, for online), length of a friendly name of the second contact in bytes (14), the friendly name of the second contact (Syed M), etc. For each contact, the IM Gateway returns a user ID and optionally a friendly name.

The LoginResponse primitive provides confirmation or the reason for failure of the login and can also provide a list of the user's contacts with presence information, e.g., online, offline, "be right back", away, "do not disturb", and "in a meeting", which is used to select the corresponding contact status icons 19 (FIGS. 8A–8E).

The LoginResponse primitive shown in FIG. 12 provides the confirmation of the login by showing that the status code is 0, for success. The LoginResponse primitive also provides the user's contact list with the corresponding presence information for each of the contacts. The total number of messages in the transaction is 1. Therefore, the message is sufficient to include the user's entire contact list with the presence information. However, it is possible to require multiple messages to deliver the user's entire contact list with presence information, such as in the example shown in FIG. 13 and described below.

Login Request/Response Exchange

Launching the MIM client or switching from one IM service to another does not result in automatically sending a login request to the IM service(s). A login request is transmitted in one of the following ways: a login request can be sent automatically after a predetermined amount of time, e.g., one hour, or the user can "force" a login request by explicitly transmitting a login request. In the process shown in FIG. 5, the user forces the login request for each of the IM services.

Figure 13:
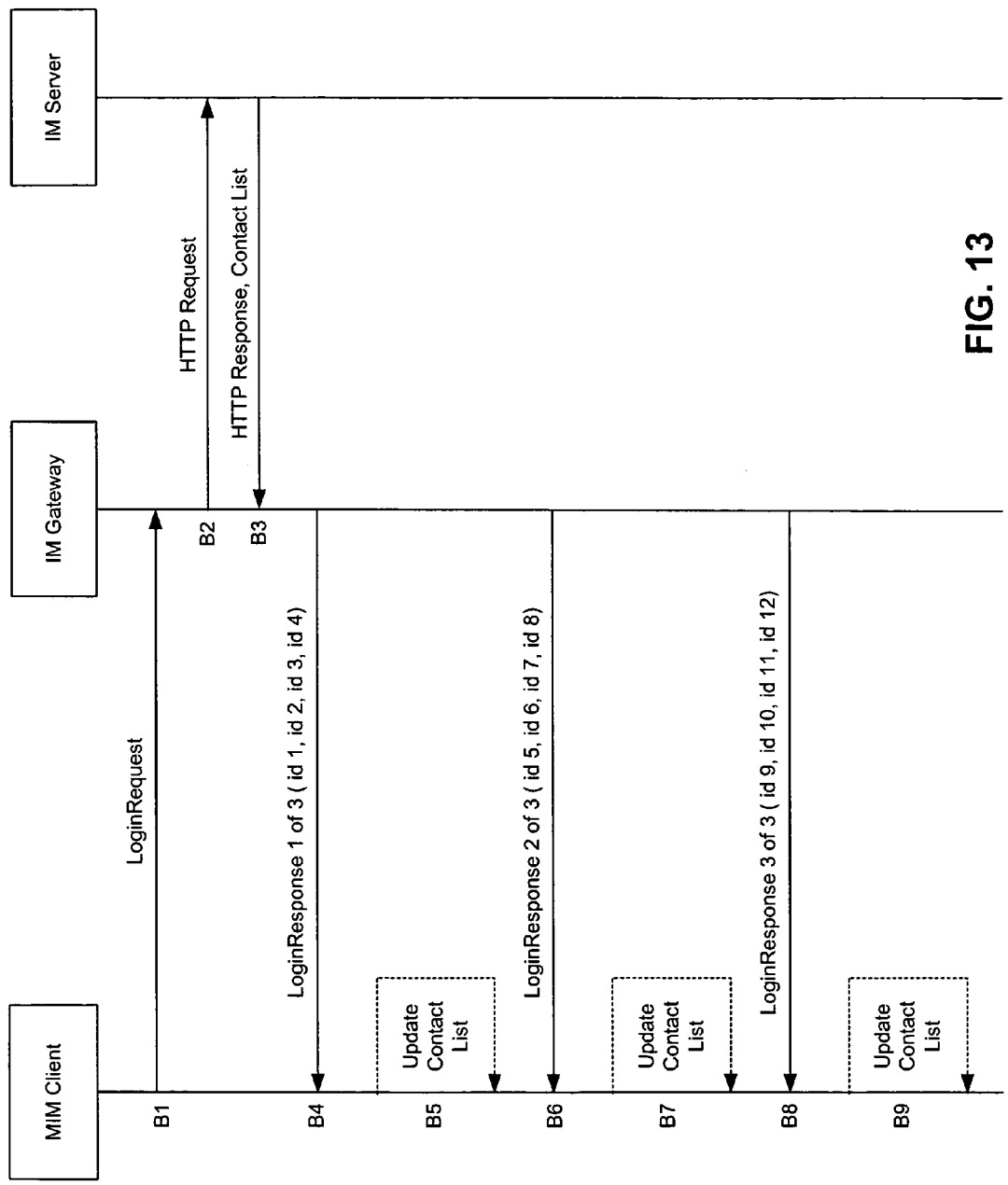
FIG. 13 is a flow chart of the message flow between the MIM client and the IM server during log in, according to an embodiment of the present invention.

FIG. 13 is a flow chart of the interaction between the MIM client and the IM Gateway when the user is logging into an IM service by sending a login request, according to an embodiment of the present invention. The message flow displayed in FIG. 13 can, for example, occur during step A5 of FIG. 5.

In step B1, the user sends, via the MIM client, a login request, such as described above in relation to FIG. 11, to the IM Gateway. The login request includes information such as the acronym (LI), the client version number, the session ID, the user name, the password, and the subscription notification identifier. The message is addressed to the short code corresponding to a login request for the particular IM service, i.e., 118012246001 for MSN, 118012245001 for AOL, or 118012243001 for Yahoo, as shown in FIG. 10.

When mobile-originated messages are received by the IM Gateway, the IM Gateway reads the message body. The IM Gateway processes the message according to the particular action specified by the short code and acronym at the beginning of the message body. If the message is a login request, the IM Gateway extracts the user name and password from the message. Alternatively, if the message is an IM text message, the IM Gateway extracts the message text and the contact to whom the message text is directed.

After the IM Gateway extracts the information from the message body, the IM Gateway formats the information using the proprietary protocol for the specific destination IM server.

In step B2, the IM Gateway establishes a connection with the IM server specified by the short code and session ID. The IM Gateway sends an HTTP request to the destination IM server. The HTTP request includes the extracted information, e.g., the user name and password. After receiving the HTTP request, the IM server verifies that the user has submitted a username registered at the IM service and the proper password corresponding to the registered username.

In step B3, if the username is registered and the password is correct, then the IM server sends an HTTP response to the IM Gateway indicating success. The IM server also sends the contact list and the corresponding presence information to the IM Gateway to be transmitted to the MIM client. Then, the IM Gateway transmits a login response to the MIM client, such as described above in relation to FIG. 12.

In step B4, the LoginResponse primitive is issued from the IM Gateway to the MIM client in response to the LoginRequest. As described above, the LoginResponse primitive includes the confirmation or the reason for failure of the login. If the login is successful, as is shown in FIGS. 12 and 13, the contact list with presence information is transmitted to the user in the LoginResponse primitive.

The size of the message is limited, and information concerning the user's contact list can exceed the limit of the size of one message, especially as the length of the contact list grows. Therefore, the LoginResponse primitive includes the message number and the total number of messages in the transaction, as described above. For the exchange shown in FIG. 13, there are 3 messages in the transaction, and the message transmitted from the IM Gateway to the MIM client in step B4 is message number 1 of the transaction. The message also includes information for four contacts (ID numbers 1–4), including their user names, presence information, and optionally friendly names. For simplicity, the contacts described in connection with FIG. 13 are referred to using ID numbers 1–12.

In step B5, the MIM client takes the information from the LoginResponse primitive received in step B4 and updates the contact list displayed in the contact list window 6 for the four contacts whose information was included in the received message. While the contact list is being updated, the MIM client can provide a visual indication that contacts with ID numbers 1–4 are being updated, such as by displaying a special icon as the contact status icon 19 for each of the contacts.

After transmitting the LoginResponse primitive in step B2, the IM Gateway sends a second LoginResponse primitive in step B6. The second LoginReponse is message number 2 of the 3-message transaction and includes information for four more contacts (ID numbers 5–8), including their user names, presence information, and optionally friendly names.

In step B7, the MIM client takes the information from the LoginResponse primitive received in step B6 and updates the contact list displayed in the contact list window 6 for the four new contacts whose information was included in the received message.

After transmitting the LoginResponse primitive in step B4, the IM Gateway sends a third LoginResponse primitive in step B8. The third LoginReponse is message number 3 of the 3-message transaction and includes information for four more contacts (ID numbers 9–12), including their user names, presence information, and optionally friendly names.

In step B9, the MIM client takes the information from the LoginResponse primitive received in step B8 and updates the contact list displayed in the contact list window 6 for the four new contacts whose information was included in the received message. After step B9, the user can view the fully updated contact list window 6.

Billing Using Short Codes

Another advantage to using different short codes corresponding to the intended actions is that each short code can be billed at a different rate to the user. For example, as shown in FIG. 13, the MIM client receives multiple login responses from the IM Gateway in order to receive the user's complete contact list, including the presence information for the contacts on the contact list. Using billing depending on the short code, a MIM service provider, i.e., the provider of the MIM service, can offer messages that are directed to the user from the short code corresponding to the login request for free, so that the user is not charged for messages of this type. Other actions can also be charged according to rates determined by the MIM service provider.

Sending/Receiving Messages

During step A9 of FIG. 5, the user sends a message to the IM Gateway using the MIM client. After the user types the message and hits the SEND button, the MIM client issues an IMRequest primitive to the IM Gateway. The IMRequest primitive begins with the action acronym M (for Message Sent), which is followed by an identifier of the recipient and the text of the message. The IMRequest primitive is addressed to the short code assigned to the acronym M and to the intended IM server.

The IM Gateway receives the IMRequest primitive and formats the message using the proprietary protocol of the particular IM server so that the message can be received and read by the IM server. The IM Gateway then makes a connection with the particular IM server by sending an HTTP request with the message text and contact name. If the message is delivered successfully, the IM server issues an HTTP response indicating that the transaction is successful.

After successfully transmitting the message to the IM server, the IM Gateway issues an IM-Msg-Delivery primitive to the MIM client if the request to send the message has failed. The IM-Msg-Delivery primitive also includes a reason why the delivery of the message failed.

When a contact sends the user a message, the IM Gateway issues an IM primitive to the MIM client to deliver the message to the user. Similar to the LoginResponse primitive, the IM primitive includes the header, the provider ID, the transaction ID, the message number, the total number of messages in the transaction, the session ID, the status code (automatically set at 0 for an instant message resulting from the IM primitive), and the text of the message.

Presence Updates (Refreshing)

The user's status can be updated (refreshed) when the MIM issues an UpdatePresence primitive to the IM Gateway with the status code. Thus, the IM server can update the user's presence information stored in the database.

The status of the contacts on the user's contact list can also be updated using one of several different methods. The user can subscribe to presence updates, which include presence information for at least one contact on the user's contact list. The user can subscribe or unsubscribe to presence updates when logging in to the IM service or while logged into the IM service. At login, the MIM client sends the subscriber update identifier ("1" for enabling presence updates or "2" for disabling presence updates) to the IM Gateway in the LoginRequest primitive as described above. After the user has logged in, the user can change this option. To change the option, the MIM client issues the Subscriber-Presence-List primitive to the IM Gateway, which includes the new subscriber notification identifier. If the Subscriber-Presence-List primitive specifies that the presence updates are enabled, the IM server responds by sending all available saved presence updates for the contacts on the user's contact list.

The presence updates can be sent to the MIM client in messages using the Presence-Notification primitive or alternatively, the presence updates can be sent to the MIM client while "piggy backing" other types of messages, such as IM primitives. Presence updates are "push" based, i.e., sent in only one direction from the IM Gateway to the MIM client.

If the presence updates are sent using the Presence-Notification primitive, the IM Gateway sends the Presence-Notification primitive to the MIM client when the IM Gateway has available presence update(s) for delivery to the MIM client. The Presence-Notification primitive provides updated presence information about a contact or a group of contacts and indicates the presence code, user name, friendly name, and any other status information of the contact(s).

Thus, after the MIM client receives the Presence-Notification primitive, the MIM client can refresh the contact list with updated presence information of the contacts on the contact list. The refresh for a particular contact can occur asynchronously, since the status of the contact can change at a different time than when the Presence-Notification primitive is issued by the IM Gateway and at a different time than when the presence update is received by the MIM client.

The refresh using the presence updates can take a few seconds to complete and the latency can be reflected visually to the user. While receiving the presence updates, the MIM client can provide a visual indication that the results of the refresh are pending. During a pending refresh using the presence updates, the user can still use the user interface, for example, to compose messages. When the refresh is completed and all the presence updates have been received, the MIM client can play a sound and/or update the visual indication. Alternatively, as the presence update is received for each contact, the MIM client can play a sound and/or update the visual indication.

The MIM client can also provide the user with the option to refresh a particular contact or can subscribe to presence updates for particular contacts.

Alternatively, rather than send messages to the MIM client with the Presence-Notification primitive, which is used specifically to transfer presence information, the presence updates can be sent to the MIM client while "piggy backing" other types of messages, such as IM primitives for sending IM text messages directed to the user of the MIM client. Thus, the presence updates are not necessarily sent to the MIM client in messages that only include the presence information. Instead, the presence updates are sent to the MIM client in unused portions of the SMS messages containing IM text messages addressed to the mobile device user and bundled with other types of information.

The presence information is bundled with user messages and other types of information in the IM primitive, for example. As the MIM client receives each SMS message including the IM primitive, the MIM client extracts the user message or other information in addition to one or more presence updates from the SMS message. Thus, the presence updates "piggy back" the user message or other information in the IM messages that are sent to the user from the user's online contacts.

Figure 14:
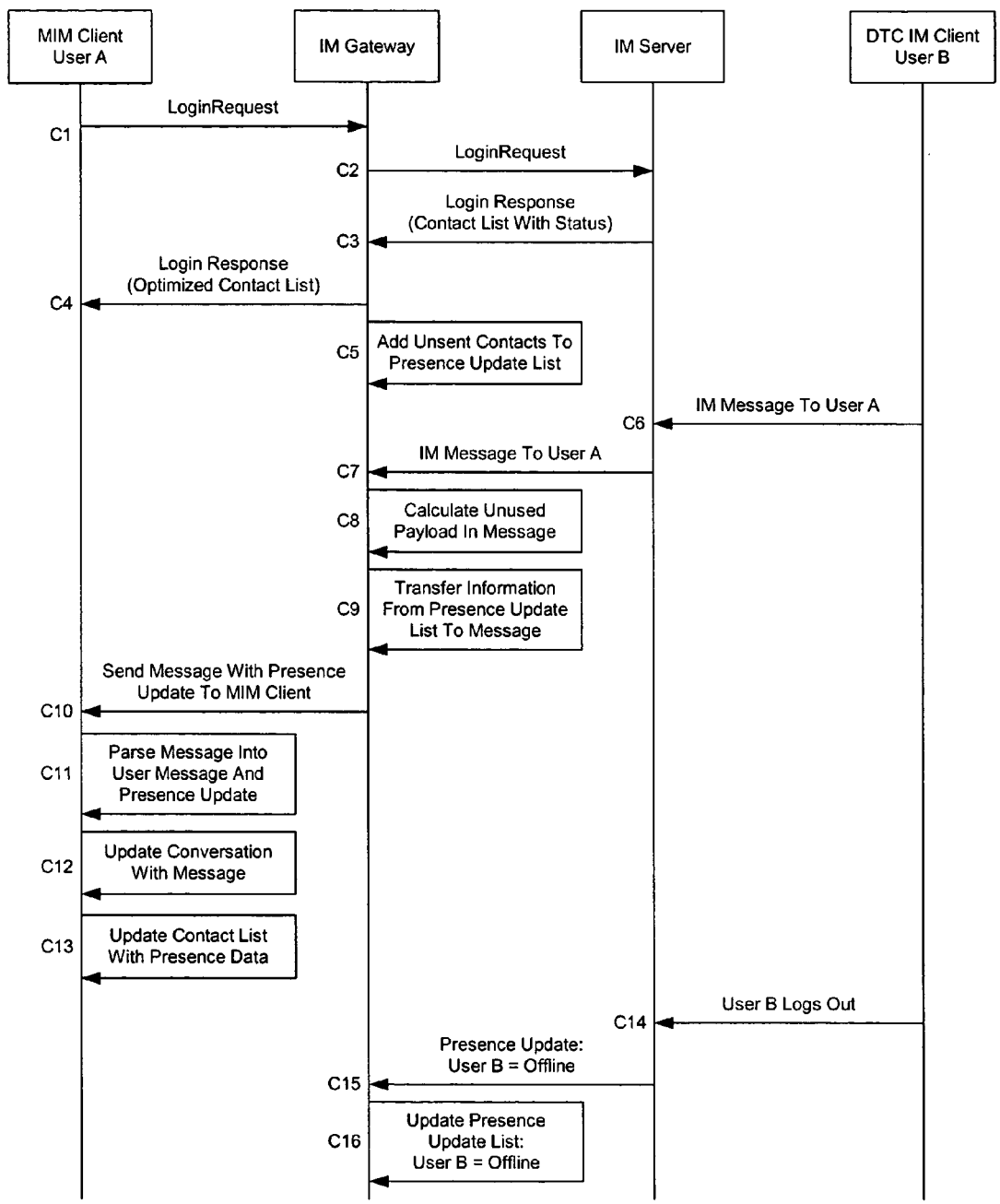
FIG. 14 is a flow chart of the message flow between the MIM client, the IM Gateway, the IM server, and an IM client for transferring presence updates, according to an embodiment of the present invention.

FIG. 14 is a flow chart of the interaction between the MIM client of the user (User A), the IM Gateway, an IM server, and an IM client of another user (User B), according to an embodiment of the present invention in which the presence updates "piggy back" the user message or other information directed to the MIM client. User A and User B are both logged in to the IM service provided by the IM server shown in FIG. 14. The message flow displayed in FIG. 14 can, for example, occur during step A5 of FIG. 5.

The presence information received from the IM server is stored in a presence update list in a cache of the IM gateway. The presence update list varies for each user and contains the presence information for each contact on the user's contact list. The presence update list in the cache is designed to maintain a unique record for each contact's presence information. Thus, the cache includes one record for a particular contact and that record reflects the latest presence information transmitted to the cache. Presence updates generated from information on the presence update list are transferred from the IM Gateway to the MIM client.

Figure 16:
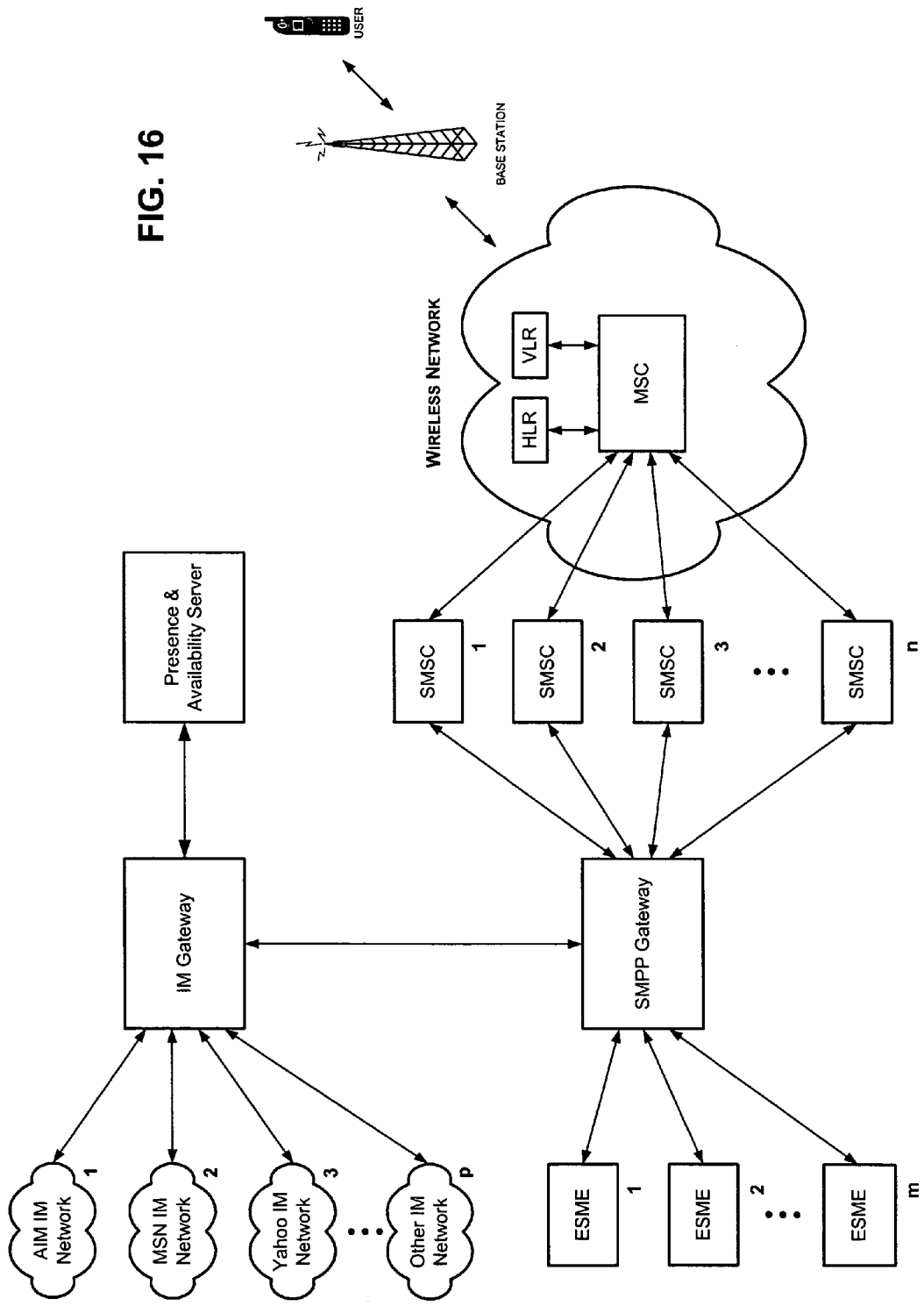
FIG. 16 is a block diagram showing the network architecture of a communications network, which includes a presence and availability server, according to an embodiment of the present invention.

The flow chart shown in FIG. 14 illustrates an example of the sequence of events that can occur after the user has logged in to an IM service. Steps C1 through C4 of the flow chart of FIG. 16 is generally the same as steps B1 through B4 of the flow chart of FIG. 13.

In step C1, User A sends, via the MIM client, a login request, such as the LoginRequest primitive described above in relation to FIG. 11, to the IM Gateway. The login request can include information such as the acronym LI, the client version number, the session ID, the user name, the password, and the subscription notification identifier. The message is addressed to the short code corresponding to a login request for the particular IM service, as shown in FIG. 10.

When the message is received by the IM Gateway, the IM Gateway processes the message and extracts, for example, the user name and password from the message. After extracting the information, the IM Gateway formats the information using the proprietary protocol corresponding to the particular IM service.

In step C2, the IM Gateway establishes a connection with the IM server specified by the short code and session ID. The IM Gateway sends an HTTP request to the destination IM server. The HTTP request includes the extracted information, e.g., the user name and password. After receiving the HTTP request, the IM server verifies that the user has submitted a username registered at the IM service and the proper password corresponding to the registered username.

In step C3, if the username is registered and the password is correct, then the IM server sends an HTTP response to the IM Gateway indicating success. The IM server also sends the contact list and the corresponding presence information for the user's contacts to the IM Gateway to be transmitted to the MIM client. Then, the IM Gateway transmits a login response to the MIM client, such as the LoginResponse primitive described above in relation to FIG. 12 or 13.

In step C4, the LoginResponse primitive is issued from the IM Gateway to the MIM client in response to the LoginRequest. As described above, the LoginResponse primitive includes the confirmation or the reason for failure of the login. If the login is successful, as is shown in FIG. 14, the contact list with the presence information can be transmitted to the user in the LoginResponse primitive.

As described above and shown in the sequence diagram of FIG. 13, since the size of the SMS messages is limited to 160 characters typically, the contact list is divided for inclusion into multiple messages that use the LoginResponse primitive, if necessary. Thus, the presence information for multiple contacts on the contact list is transferred to the MIM client using one or more LoginResponse primitives. For the exchange shown in FIG. 13, there are 3 messages in the transaction, each message including information for four contacts (ID numbers 1–4, 5–8, and 9–12), including user names, presence information, and optionally friendly names.

Information concerning the user's contact list can exceed the limit of the size of one message, especially as the length of the contact list grows. In the embodiment of the invention shown in the sequence diagram of FIG. 14, multiple LoginResponse primitives can also be transmitted from the IM Gateway to the MIM client to transfer information for multiple contacts.

The IM Gateway is configured to limit the number of contacts and their presence information that are included with the Login Response. For example, the user may limit the number of contacts to 30, whereas the user's contact list may include 300 contacts. In this case, the IM Gateway transfers the maximum 30 contacts and their respective presence information in one or more Login Response primitives to the MIM client. As shown in FIG. 13, the contact list displayed on the mobile device may be updated after receiving each Login Request primitive. Thus, the SMS message(s) including the LoginResponse primitive(s), which is transferred in step C4 from the IM Gateway to the MIM client, is limited to include presence information for only 30 contacts. The included presence information, like the presence updates, includes the user name of the contact and a presence code identifying the status of the contact, e.g., whether the contact is online, offline, going to be right back, away, not wanting to be disturbed, or in a meeting.

The presence information is included in the SMS message containing the login response and is extracted from the SMS message after the SMS message is received by the MIM client. The MIM client then uses the presence information extracted from the login response message to update the user's displayed contact list accordingly.

In the example introduced above, there are 270 remaining contacts with presence information that have not been delivered to the MIM client.

In step C5, the IM Gateway adds the unsent presence information for the remaining contacts to the presence update list in the cache. The presence information is stored in the cache of the IM Gateway so that the presence information for the contacts on the presence update list can be transferred to the MIM client in presence updates that "piggy back" messages sent to the user. The unsent presence information is indicated on the presence update list as being available to send to the MIM client.

In step C6, User B, who is logged in to the same IM service, sends an instant message to User A. The instant message is transferred from the IM client used by User B to the IM server.

In step C7, the instant message is transferred from the IM server to the IM Gateway where it is converted into an SMS message containing the IM primitive.

In step C8, the IM Gateway calculates the unused payload in the SMS message that includes the IM primitive. The number of presence updates embedded into an SMS message depends on the amount of unused payload in the SMS message and the number of presence updates that are pending in the IM Gateway. Therefore, before the IM primitive is transmitted, the SMS message containing the IM primitive is analyzed to determine the amount of unused payload present in the SMS message.

Each SMS message typically has a fixed payload of 160 characters. The amount of unused payload is determined by subtracting the number of characters required for the instant message, such as the message body, the sender ID, the header, and other information.

FIG. 15 shows two examples of the composition of a mobile-terminated IM primitive with embedded presence updates.

In Example A, the IM primitive includes a prefix with a header with routing information (//MIM:xxx:), provider ID (3, for MSN), transaction ID (1), message number (1), total number of messages in the transaction (1), and session ID (1).

The IM primitive also includes a message portion with a command ID (acronym, M, for an instant message), byte offset (41, for the location in bytes for the presence update data), status code (0, for an instant message resulting from the IM primitive), optimized sender ID (john@3, for john@msn.com, User B's address), and message body (Hello Brandie).

The prefix is 15 characters long, and the message portion is 26 characters long. Since one byte corresponds to one character, the byte offset is the number of characters that precede the presence updates. In Example A, the prefix and the message portion precede the presence updates and are 41 characters long (15+26=41). Therefore, the byte offset is "41." Since the maximum payload is 160 characters, the total unused payload in Example A is 119 (160−41=119).

In Example B, the IM primitive includes a prefix with a header that is set up similar to the prefix in Example A. The prefix includes a header with routing information (//BREW: xxx:), provider ID (2, for Yahoo), transaction ID (2), message number (1), total number of messages in the transaction (1), and session ID (8).

The IM primitive of Example B includes a message portion that is different from the message portion of Example A. The message portion of Example B includes a command ID (acronym, M, for an instant message), byte offset (38, for the location in bytes for the presence update data), status code (0, for an instant message resulting from the IM primitive), sender ID (combptest, User B's user name), and message body (Test).

The prefix is 16 characters long, and the message portion is 22 characters long. Since one byte corresponds to one character, the byte offset is the number of characters that precede the presence updates. In Example B, the prefix and the message portion precede the presence updates and are 38 characters long (16+22=38). Therefore, the byte offset is "38." Since the maximum payload is 160 characters, the total unused payload in Example B is 122 (160−38=122).

In step C9, the IM Gateway transfers presence information from the presence update list to the SMS message.

The presence updates are located at the end of the IM primitive. In both examples, there are two presence updates available to be included in the IM primitive. Since there is only one message in the transaction, as specified in the prefix, there are no more presence updates available to send to the MIM client. Otherwise, if there were more messages in the transaction, this would indicate that the remaining presence update(s) is too large to fit into the unused payload of this SMS message.

In Example A, the first presence update includes the first contact's address (kevin@1, for kevin@aol.com) and respective presence code (1, for "online"). The second presence update includes the second contact's address (jerry@2, for jerry@yahoo.com) and respective presence code (1, for "online"). 9 characters are included in the first presence update, and 10 characters are included in the second presence update. The available unused payload is 119 characters, and the presence updates are 19 characters total. Thus, the two presence updates are included in the SMS message although there is enough payload in the SMS message to incorporate additional presence updates of up to 100 characters (119−19=100).

Like Example A, in Example B, there are also two available presence updates to deliver to the MIM client. 18 characters are included in the first presence update, and 8 characters are included in the second presence update. The available unused payload is 122 characters, and the presence updates are 26 characters total. Thus, the two presence updates are included in the SMS message although there is enough payload in the SMS message to incorporate additional presence updates of up to 96 characters (122−26=96).

In Example B, the sender ID and contact user names are not optimized to include the IM service that the contact is logged in to. The type of IM primitive in Example B is used when the presence updates embedded in the IM primitive include presence information for contacts of the same IM service that is used to send the instant message from User B to User A. Thus, the contacts in the presence updates, User A, and User B are all belong to the same IM service. It is not necessary to specify the IM service for the sender ID and the contacts, since the IM service is the same as the IM service specified in the provider ID in the prefix portion of the IM primitive. The type of IM primitive in Example A can be used when the contacts in the presence updates belong to different IM services.

Furthermore, the message portion of Example B includes a presence code for the sender of the message, User B. This eliminates the need to send to the MIM client an additional presence update corresponding to the sender of the instant message.

In step C10, the IM Gateway sends the SMS message with the presence updates to the MIM client.

In step C11, the MIM client parses the SMS message into the user message and the presence updates.

In step C12, the MIM client updates the conversation or opens a new conversation displayed in the conversation history window 7 (or 7', 7") with the message body from the user message.

In step C13, the MIM client updates the user's contact list 18 (or 18', 18") displayed in the contact list screen 6 (or 6', 6") with the presence information received in the presence updates transmitted in the SMS message. Specifically, the contact status icons 19 (or 19', 19") corresponding to the presence updates in the SMS message are updated according to the information received in the presence updates.

Steps C6 through C13 are repeated until all available presence updates have been transmitted to the MIM client. However, the presence update list can still be updated while the presence updates are being transferred to the MIM client. For instance, if User B logs out from the particular IM service, the presence update list can be updated to reflect this change so that the appropriate presence update may be transferred to the MIM client while "piggy backing" an instant message directed to User A.

In step C14, User B sends a command to the IM server to log out from the particular IM service.

In step C15, the IM server sends the presence information to the IM Gateway indicating that User B is offline.

In step C16, the presence update list is updated to reflect that User B is offline, and the presence information for User B is indicated as being available to send to the MIM client as soon as there is available unused payload in an SMS message directed to User A to accommodate the presence update.

The process shown in FIG. 14 and described above can be adapted to change the presence information for multiple contacts instead of a single contact, i.e., User B. For example, steps C14 through C16 could also occur when a User C logs in to the particular IM service so that in step C15, the IM server sends presence information to the IM Gateway indicating that User C is online and in step C16, the presence update list is updated to reflect that User C is online. Steps C14 through C16 can be adapted for other types of events that would change a contact's online status.

Furthermore, at any time after step C5, the presence information for one or more of User A's contacts may change, and the presence information may be delivered to the IM Gateway from the IM servers. Subsequently, the corresponding presence updates for the respective contacts can be indicated as being available on the presence update list to send to the MIM client as soon as there is available unused payload in an SMS message directed to User A from the IM Gateway.

Additionally, steps C6 through C13 can be adapted for other types of messages instead of being limited to instant messages including the IM primitive that are delivered to User A while presence updates are available on the presence update list.

The process described above for steps C1 through C16 can be completed after the user selects the Login operation. Alternatively, the process described above for steps C5 through C16 can be completed after the user selects a Refresh List option, e.g., listed on the options menu provided by the options menu icon 13 (or 13', 13").

This process of adding presence information to instant messages sent to the MIM client increases the efficiency of the telecommunications network, thereby offering more value to the end users of the network.

Dynamically Building the Contact List

In the methods for updating the contact list described above, the contact list can be updated before the complete list has been received by the MIM client. As described above and shown in FIG. 13, the contact list can be delivered using multiple messages in a single transaction.

According to the present invention, the MIM client does not have to wait until all messages for a transaction have been received in order to process the transaction. The MIM client is capable of processing the individual messages and dynamically building the contact list as each message is received from the IM Gateway. Therefore, the user can interact with the user interface of the MIM client as it is processing the contact list without having to wait for the MIM client to receive the complete contact list.

Login/Logout Behavior

The user is not required to log off one IM service before logging on to another. However, a log off option is provided by the MIM client. The MIM client does not send a log off command to the IM service unless the user logs off explicitly. Thus, if the user closes the mobile device, then the MIM client does not automatically send a log off command.

Alternatively, the user can have the option to set the IM Gateway to automatically log off the user after a certain time period, e.g., 26 hours.

Similar to the login request described above, one logout request is sufficient for logging off of multiple IM services. The logout request is issued by the MIM client as an SMS message with multiple logout instructions in the LogoutRequest primitive. The MIM client then sends to each of the IM services to which the user is subscribed the logout request. Since each of the chosen IM services can use a different IM service-specific proprietary protocol, the IM Gateway sends separate logout requests to each IM service, and each logout request is formatted to be recognized by the IM service that is intended to receive the request.

Auto-Forwarding

The MIM client does not automatically send a logout message to an IM service when the user closes the MIM client. The MIM client sends a logout message when the user specifically chooses the logout option. Thus, when the user shuts down the MIM client, the mobile device does not automatically log off of the IM service(s) to which the user has logged in and can therefore still receive IM messages from the IM service(s). However, if the user chooses to log off, the user can send a logout request, and after sending the logout request, the user appears with the status "logged off" on the contact lists of other users of the particular IM service who have listed the mobile user in their contact lists.

When the user is not logged in to an IM service, e.g., the MIM client is shut down, the mobile device can still receive IM messages from the IM service, according to an embodiment of the invention. This feature is called "auto-forwarding." Unlike a PC version of an IM client, once the MIM client is shut down, messages can still be received in the mobile device using the auto-forwarding option.

Auto-forwarding allows a user to establish his/her 10-digit phone number as a destination for IM messages when the user is not logged in to the IM service. With auto-forwarding activated, other IM service users, such as the user's contacts, can send IM messages to the user through their PC-based or mobile device-based IM clients. The auto-forwarded messages are sent as standard non-IM SMS messages, and the user can be prompted to be able to launch the MIM client after receiving one of the messages.

Message Non-Delivery

If message delivery by the SMSC fails due to a temporary failure, e.g., the mobile device is unregistered or unable to be located and one of the user's contacts sends a message to the user, then the SMSC servicing the user's mobile device cannot deliver the message.

The SMSC stores the undelivered message for a predetermined period of time (lifetime), e.g., a selected number of minutes. For the lifetime of the stored, undelivered message, the SMSC waits until receiving notification from the HLR that the user is registered, i.e., the user has turned on the mobile device. The SMSC requests the HLR to notify the SMSC when the indicated mobile device becomes available. Once the SMSC is notified that the user is registered, the SMSC sends the stored message to the user and deletes the message from storage.

If the lifetime of the message expires while the message is stored on the SMSC, then the SMSC deletes the message. Once the message has expired, then the SMSC sends a notification of expiration to the IM Gateway. Since the user is unable to receive the message and is unregistered with the HLR, the IM Gateway can initiate a logout sequence with the IM service and the MIM client so that the IM service and MIM client can update the status of the particular user as "logged off," or the IM Gateway can send an HTTP message to the IM service and a Presence Notification primitive to the MIM client so that the IM service and MIM client can update the status of the particular user as "away." The IM Gateway initiates a logout sequence with the IM service through which the message was sent. The IM Gateway also sends a logout request message to the MIM client. The logout request ensures that as soon as the mobile device is turned back on and receives the logout request from the IM Gateway, the MIM client logs off the user from the particular IM service.

Alternatively, when the user turns on the mobile device after being automatically logged out from the IM service, as described above, the MIM client can automatically log the user back into the IM service. The MIM client automatically issues a SMS message including the LoginRequest primitive delivered previously to the IM Gateway.

In an embodiment of the present invention, if a "not logged in" error message is received by the user from the IM service, e.g., when the IM service is not able to receive a message sent from the MIM client and the MIM client has not received a logout request issued by the IM Gateway, then the MIM client prompts the user to send a login request. After logging in, the MIM client prompts the user to re-send the last message that generated the "not logged in" error message.

Presence and Availability Server

FIG. 16 shows a communications network that includes a presence and availability server for a user to exchange messages with contacts logged into IM services, according to an embodiment of the present invention. The network is similar to the network shown in FIG. 2, except that the network of FIG. 16 includes a presence and availability server connected to the IM Gateway.

As described above, if the user has turned off the mobile device, becomes unregistered in the HLR, and subsequently receives a message from another user, then the SMSC stores the undelivered message and queries the HLR until the user re-registers with the HLR. The presence and availability server aids in providing presence information for mobile device registration and unregistration by exchanging SMS messages with the IM Gateway.

Figure 17:
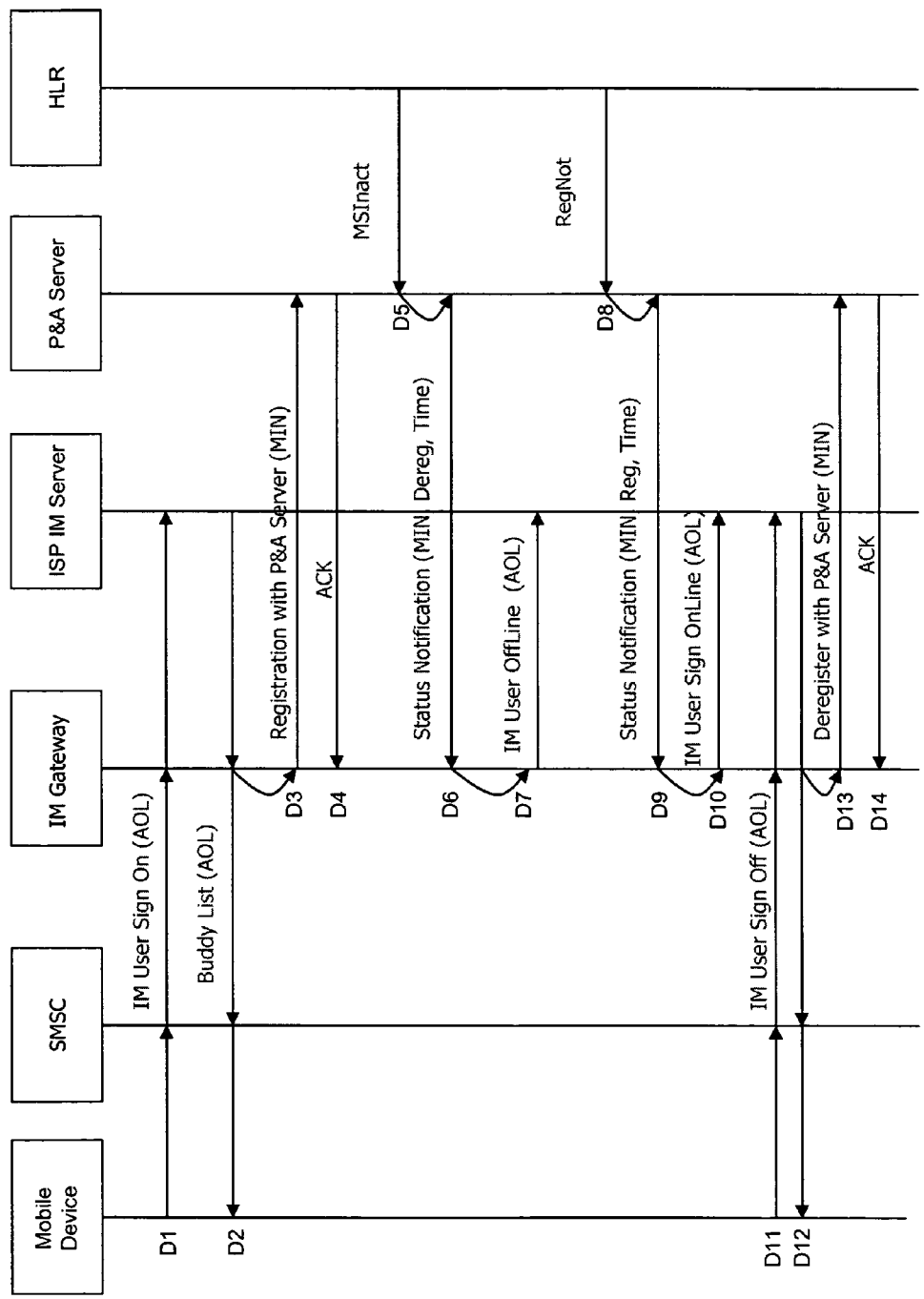
FIG. 17 is a flow chart of the message flow between the MIM client and the HLR via a presence and availability server, according to an embodiment of the present invention.

FIG. 17 shows the message flow between the mobile device and the HLR over the communications network shown in FIG. 16, according to an embodiment of the present invention. The embodiment shown in FIG. 17 is directed to a mobile device for a user who is logged into the AOL IM service. However, the same system can be used for a user who is logged into multiple IM services by repeating the process for each IM service. In FIG. 17, the user of the mobile device logs into the AOL IM service and is subsequently registered with the HLR, such as for a typical operation of the mobile device, and with the presence and availability server for presence notifications from the IM service.

In step D1, the user initiates the log in process and the MIM client issues a LogonRequest primitive to the IM Gateway. The IM Gateway, in turn, sends an HTTP request to the IM server with the login information. The IM server verifies the login information.

In step D2, the IM server sends an HTTP response back to the IM Gateway, with a notification that the login is successful and also including contact list information for the MIM client. The contact list information, including user names and presence information, is forwarded by the IM Gateway to the MIM client using the LoginResponse primitive.

In step D3, after receiving the HTTP response and contact list information from the IM server, the IM Gateway sends a registration message for the user to the presence and availability server. The registration message includes the mobile ID number (MIN) assigned to the mobile device. The MIN is used to track the user. After registering with the presence and availability server, the user can receive presence notifications from the presence and availability server, which sends the presence notifications to the IM Gateway for each contact on the user's contact list. Since the presence and availability server handles the presence information, such as the registration and deregistration of the users, the IM server is freed from handling this function.

In step D4, the presence and availability server responds by sending an acknowledgement to the IM Gateway that the user is registered in the presence and availability server. Following step D4, the user can use the MIM client to exchange messages with other users of the AOL IM service.

Before starting the process shown in FIG. 17, the HLR acknowledges that the mobile device is registered while the mobile device is powered on and locatable by the SMSC. When the SMSC has determined that the mobile device is inactive, e.g., the mobile device is unregistered or unable to be located and one of the user's contacts sends a message to the user, then the SMSC servicing the user's mobile device cannot deliver the message. As described above, the SMSC stores the undelivered message for a predetermined period of time and waits until receiving notification from the HLR that the user is registered, i.e., the user has turned on the mobile device.

In step D5, the HLR delivers a MSInact (mobile station inactive) message to the presence and availability server via the communications network after being notified that the mobile device is inactive. The MSInact message notifies the presence and availability server of the inactivity of the mobile device.

In step D6, the presence and availability server delivers a status notification to the IM Gateway indicating that the mobile device is unregistered. The status notification message includes the MIN of the mobile device, the time, and a registration status code identifying the mobile device as being unregistered.

In step D7, the IM Gateway delivers a message to the IM server to notify the IM server that the user is offline.

If the HLR determines that the mobile device is active, i.e., the mobile device is powered on and registered in the HLR, then in step D8, the HLR delivers a RegNot (registration notification) message to the presence and availability server via the communications network with the notification that the mobile device is active. The HLR also notifies the SMSC that the mobile device is registered, and the SMSC sends the stored message to the user's mobile device and deletes the message from storage.

In step D9, the presence and availability server delivers a status notification to the IM Gateway indicating that the mobile device is registered. The status notification message includes the MIN of the mobile device, the time, and a registration status code identifying the mobile device as being registered.

In step D10, the IM Gateway delivers a message to the IM server to notify the IM server that the user is online. Following step D10, the user can use the MIM client to exchange messages with other users of the AOL IM service.

In step D11, the user initiates the logout from the AOL IM service by transmitting a LogoutRequest message to the IM Gateway. The IM Gateway then sends an HTTP request to the IM server with the logout request, and the IM server processes the logout request.

In step D12, the IM server sends an HTTP response to the IM Gateway to acknowledge the logout request, and the IM Gateway sends a LogoutResponse message to the MIM client.

In step D13, after receiving the HTTP response from the IM server, the IM Gateway sends a deregistration message for the user to the presence and availability server. The deregistration message includes the MIN assigned to the mobile device.

In step D14, the presence and availability server responds by sending an acknowledgement to the IM Gateway that the user is unregistered in the presence and availability server.

The presence and availability server can store the presence information of the user, rather than storing the information in the IM server.

Screensaver

If a screensaver is provided on the mobile device, the MIM client is capable of suppressing the screensaver so that after a predetermined amount of time, e.g., one minute, of inactivity, the MIM client can display the contact list for the currently active or more recently used IM service.

When the MIM client is shut down, the screensaver launches the MIM client after the predetermined period of inactivity.

During installation of the MIM client, the MIM client can prompt the user to replace the screensaver with the contact list. The MIM client also provides an option to toggle between using the MIM client to suppress the screensaver and showing the contact list instead.

Application Suspend/Resume

The MIM client controls the phone display while the MIM client is active. The MIM client can be automatically activated when the mobile device receives an incoming IM message from an IM service, even during a phone call. Furthermore, in order to place an outgoing phone call or to use general phone features, the mobile device user is required to suspend or end the MIM client.

The MIM client can be suspended in response to certain events, such as the receipt of an incoming phone call or non-IM SMS message. When the user is notified of an incoming voice call and the MIM client is active, the MIM client provides an option for allowing the user to end the MIM client to answer the phone call; to suspend the MIM client to answer the phone call; or to ignore the voice call. Likewise, when the user is notified of an incoming non-IM SMS message and the MIM client is active, the MIM client provides an option for allowing the user to end the MIM client to view the non-IM SMS message; to suspend the MIM client to view the non-IM SMS message; or to ignore the non-IM SMS message. If the mobile device user elects to suspend the MIM client to view the non-IM SMS message, the SMS inbox can display the SMS message automatically upon suspension of the MIM client.

If the user has suspended the MIM client and accepted the voice call or non-IM SMS message, the MIM client can be resumed (re-activated or launched) after the user has completed the incoming phone call or closed the non-IM SMS message. When resumed, the MIM client displays the last screen viewed before the MIM client was suspended.

Alternate Embodiment

Figure 18:
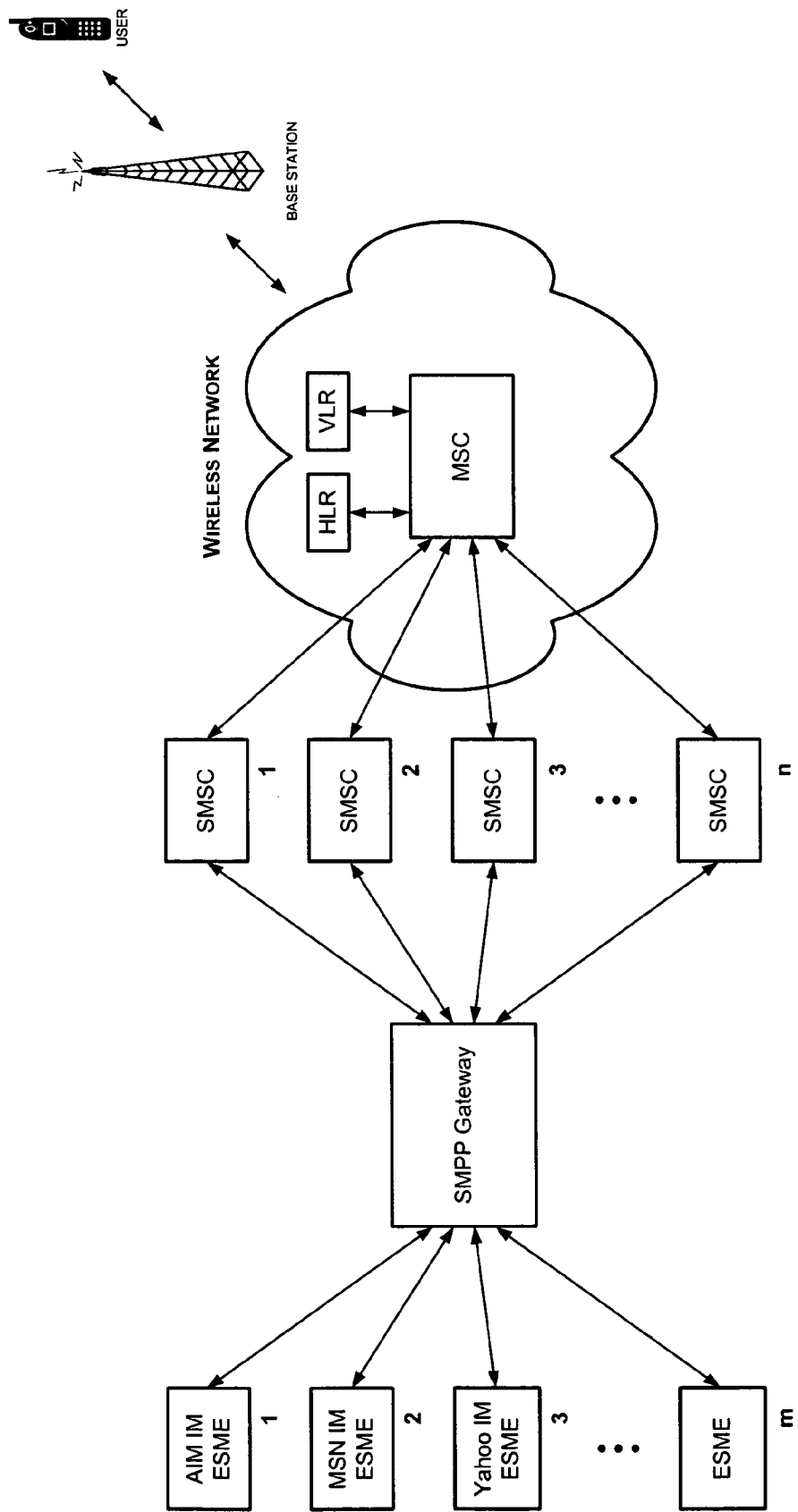
FIG. 18 is a block diagram showing the network architecture of a communications network, which is capable of transferring instant messages, according to another embodiment of the present invention.
Figure 19:
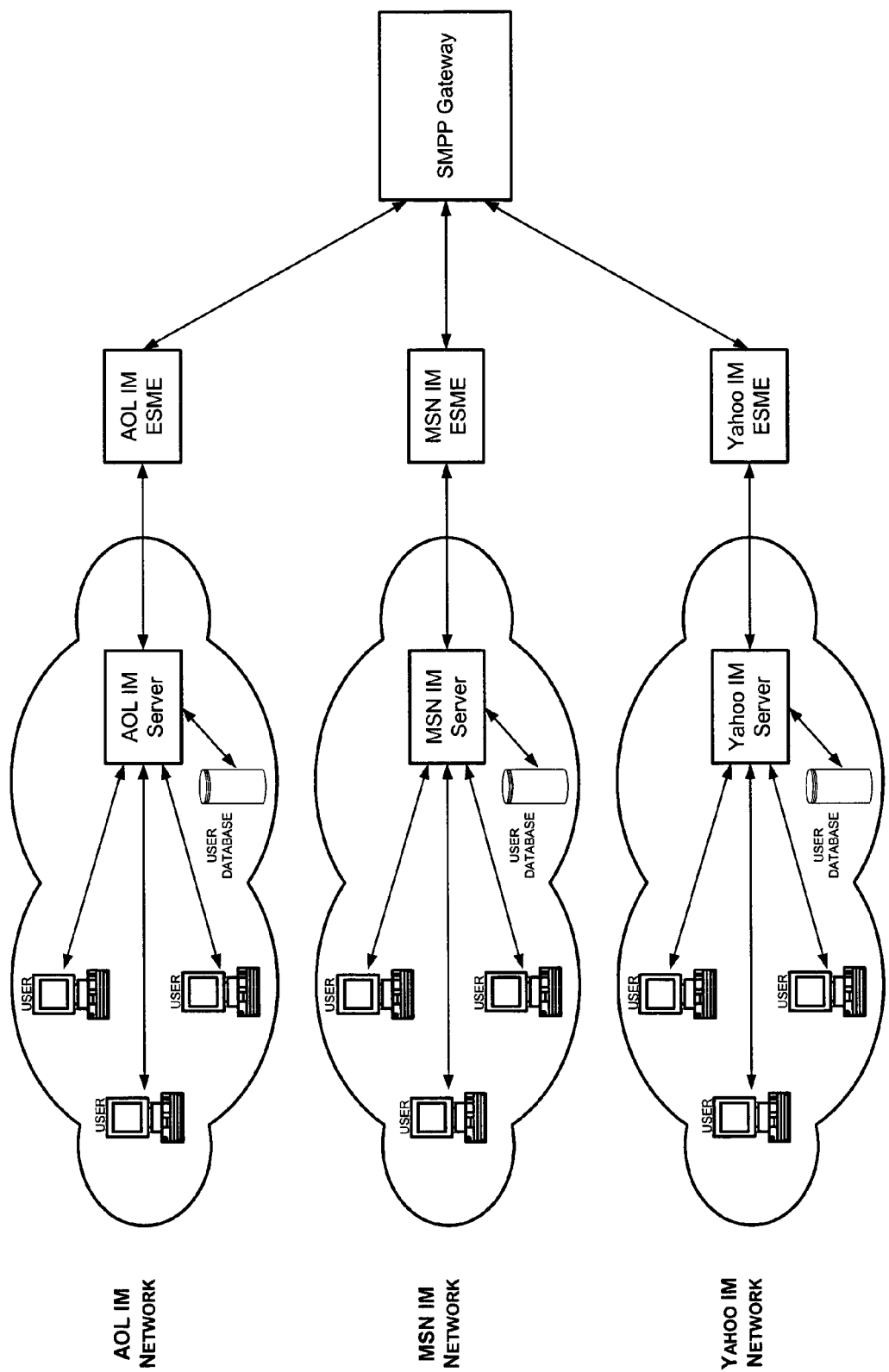
FIG. 19 is a block diagram showing the connection between various IM networks of FIG. 18.

FIGS. 18 and 19 show another embodiment of the present invention in which multiple ESMEs (IM ESMEs) are provided for each of the various IM service providers and are each connected to a separate IM server. The SMS messages are exchanged using the same method described above. In this embodiment of the invention, the protocol translations are accomplished using separate IM ESMEs instead of a single IM Gateway. The separate IM ESMEs act as individual IM Gateways for each IM service.

In this embodiment, mobile-originated SMS messages are directed to the proper IM ESME based on the short code or phone number to which the SMS message is directed. The short code or phone number differs for each action and IM service. After receiving the SMS message, the IM ESME converts the message into the proper IM service-specific format and then transfers the message to the IM server.

IM messages from the IM server are formatted into SMPP protocol by the IM ESME and then forwarded as mobile-terminated SMS messages to the proper MIM client based on the phone number to which the SMS message is directed.

Having described embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A system for exchanging messages between a mobile device and a plurality of IM services, said system comprising:
   an SMS-based MIM client running on a mobile device and providing a plurality of user interfaces, each interface for one of a plurality of IM services, the MIM client capable of exchanging IM messages with at least one of the IM services;
   wherein a user of the mobile device can choose to log in to at least one of the IM services using the MIM client and messages can be exchanged between the mobile phone user using the MIM client and contacts logged into the at least one chosen IM service,
   wherein the MIM client displays a contact list showing status of the contacts logged into the at least one chosen IM service, and the contact list is used to segregate the users into groups according to the at least one chosen IM service, and
   wherein the MIM client receives the contact list due to the user selecting Login, the contact information and corresponding presence information is received from the chosen IM service in at least one message, and the contact list is dynamically updated each time the MIM client receives one of the messages comprising the presence information.

2. The system of claim 1, further comprising a PC interface for use by at least one of the contacts to log in to the at least one chosen IM service.

3. The system of claim 1, wherein the IM services are selected from the group consisting of AOL Instant Messenger, MSN Messenger, and Yahoo Messenger.

4. The system of claim 1, wherein:
   the at least one chosen IM service comprises a first IM service and a second IM service, and
   the mobile device user can log in to the first IM service while being logged in to the second IM service.

5. The system of claim 4, wherein the MIM client allows the mobile device user to interact with one of the IM services at a time.

6. The system of claim 4, wherein the MIM client allows the mobile device user to log in to the first IM service and the second IM service while maintaining all user session data relating to a session with the first IM service and a session with the second IM service.

7. The system of claim 1, further comprising an IM gateway connected to a plurality of IM servers and the MIM client, wherein an IM message sent from one of the contacts logged in to the at least one chosen IM service fails to be delivered to the MIM client; and the IM gateway issues a message to the IM service to change a status of the user.

8. The system of claim 1, wherein:
the at least one chosen IM service comprises a first IM service and a second IM service, and the chosen IM service notifies the mobile device user when a message is received from the first IM service when the mobile device user is accessing the second IM service.

9. The system of claim 1 further comprising an IM gateway connected to a plurality of IM servers and the MIM client, wherein:
the MIM client exchanges IM messages with at least one of the IM servers via the IM gateway;
the IM gateway provides separate logout instructions for each of the IM services that the mobile device user is logged in to; and
each of the logout instructions is formatted to follow a proprietary protocol of each of the respective IM services.

10. The system of claim 1, wherein the mobile device user transmits a login request for logging into the at least one chosen IM service from the MIM client to an IM server providing the at least one chosen IM service.

11. The system of claim 10, wherein:
the login request is in the form of at least one SMS message comprising login instructions directed to the at least one chosen IM service;
the MIM client provides the login instructions; and
the login instructions are formatted to follow a proprietary protocol of the at least one chosen IM service.

12. The system of claim 1, wherein the MIM client can be suspended by the mobile device user when the mobile device user is notified of the receipt of at least one of a voice phone call and a non-IM SMS message.

13. The system of claim 1, wherein the MIM client can be automatically activated when the mobile device user is notified of the receipt of a message from one of the IM servers.

14. The system of claim 1, wherein the messages received by the mobile device user comprise a prefix tag, the prefix tag indicating at least one of a teleservice type of the received message and software used to create the MIM client.

15. The system of claim 1, wherein the mobile device comprises an address book that can be accessed when the mobile device user makes a phone call and when the mobile device user addresses a message to one of the contacts.

16. The system of claim 1, wherein the MIM client stores short codes for addressing IM messages to one of the contacts, the short codes depending on functions of the IM messages and depending on the chosen IM service for the IM messages.

17. The system of claim 1, further comprising an IM gateway connected to a plurality of IM servers and the MIM client, wherein the IM gateway stores a plurality of short codes for each of the IM services and the short codes are used to direct messages from the MIM client to the respective IM servers.

18. The system of claim 1, further comprising an IM gateway for transferring presence information of at least one contact of the at least one chosen IM service, wherein the MIM client receives the presence information and updates a contact list displayed by the MIM client using the presence information.

19. The system of claim 18, wherein the MIM client provides a visual indication that the MIM client is waiting to receive the presence information.

20. The system of claim 18, wherein:
the IM gateway calculates an unused payload of at least one of the SMS messages comprising a text message directed to the mobile device user;
the IM gateway uses the calculation of the unused payload to determine the amount of the presence information to add to the unused payload of the at least one SMS message comprising the text message; and
the MIM client receives the presence information in the at least one SMS message comprising the text message.

21. The system of claim 18, wherein the IM gateway comprises a cache and a presence update list stored in the cache, wherein the presence update list identifies the presence information that is available to send to the MIM client and stores a unique record of the presence information for each contact listed on the presence update list.

22. A method for exchanging messages between a mobile device and an IM service, said method comprising the steps of:
launching an MIM client running on a mobile device providing a plurality of user interfaces each for one of a plurality of IM services;
selecting at least one IM service to which to log in;
sending at least one message using the MIM client to at least one contact logged into the at least one selected IM service;
transferring presence information of at least one other contact of the at least one chosen IM service; and
updating a contact list displayed by the MIM client using the presence information;
wherein the transferring step further includes the steps of:
calculating an unused payload of at least one SMS message comprising a text message directed to a user of the mobile device; and
using the calculation of the unused payload to determine the amount of the presence information to add to the unused payload of the at least one SMS message comprising the text message.

23. A communications network for enabling at least one user of a mobile device to exchange messages with a plurality of users each logged in to at least one of a plurality of IM services, said network comprising:
an interface for each of a plurality of IM services each provided by one of a plurality of IM servers, each interface allowing at least one user of a mobile device to exchange at least one message with a plurality of contacts each logged in to at least one of the IM services;
an IM gateway connected to each of the IM services; and
an SMPP gateway connecting the IM gateway to the at least one mobile device user,
wherein the IM gateway transfers presence information of at least one contact, and the mobile device receives the presence information and updates a contact list displayed by the mobile device using the presence information, and
wherein the IM gateway calculates an unused payload of at least one message comprising a text message directed to the mobile device user, the IM gateway uses the calculation of the unused payload to determine the amount of the presence information to add to the unused payload of at least one message comprising the text message, and the mobile device receives the presence information in the at least one message comprising the text message.

24. The communications network of claim 23, wherein the contact list displayed on the mobile device provides a visual indication that the presence information is being received.

25. The communications network of claim 23, wherein the IM gateway comprises a cache and a presence update list stored in the cache, wherein the presence update list identifies the presence information that is available to send to the mobile device and stores a unique record of the presence information for each contact listed on the presence update list.

* * * * *

UNITED STATES PATENT AND TRADEMARK OFFICE
CERTIFICATE OF CORRECTION

| | | |
|---|---|---|
| PATENT NO. | : 7,120,455 B1 | Page 1 of 1 |
| APPLICATION NO. | : 10/851778 | |
| DATED | : October 10, 2006 | |
| INVENTOR(S) | : Xuming Chen et al. | |

It is certified that error appears in the above-identified patent and that said Letters Patent is hereby corrected as shown below:

TITLE PAGE ITEM (73)

Please delete "Cellco Partnership, Bedminister, NJ (US)" and substitute with

-- Cellco Partnership D/B/A Verizon Wireless, Bedminister, NJ (US) --.

Signed and Sealed this

Nineteenth Day of December, 2006

JON W. DUDAS
*Director of the United States Patent and Trademark Office*